US011593423B2

(12) United States Patent
Des Jardins et al.

(10) Patent No.: US 11,593,423 B2
(45) Date of Patent: *Feb. 28, 2023

(54) DYNAMIC CONTENT RECOMMENDATIONS

(71) Applicant: Comcast Cable Communications, LLC, Philadelphia, PA (US)

(72) Inventors: George Thomas Des Jardins, Washington, DC (US); Erik M. Schwartz, Kensington, MD (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/993,789

(22) Filed: Aug. 14, 2020

(65) Prior Publication Data

US 2021/0064647 A1 Mar. 4, 2021

Related U.S. Application Data

(63) Continuation of application No. 14/310,327, filed on Jun. 20, 2014, now Pat. No. 10,776,414.

(51) Int. Cl.
*G06F 16/435* (2019.01)
(52) U.S. Cl.
CPC ................... *G06F 16/435* (2019.01)
(58) Field of Classification Search
CPC ..................................................... G06F 16/435
See application file for complete search history.

(56) References Cited

U.S. PATENT DOCUMENTS

| 6,477,123 | B1 | 11/2002 | Hutter |
| 6,782,551 | B1 | 8/2004 | Entwistle |
| 6,925,610 | B2 | 8/2005 | Thurston et al. |
| 7,509,663 | B2 | 3/2009 | Maynard et al. |
| 7,624,416 | B1 | 11/2009 | Vandermolen et al. |

(Continued)

FOREIGN PATENT DOCUMENTS

| EP | 1454484 B1 | 9/2004 |
| EP | 1901475 A2 | 3/2008 |

(Continued)

OTHER PUBLICATIONS

E. Larson and S. Taulu, "Reducing Sensor Noise in MEG and EEG Recordings Using Oversampled Temporal Projection," in IEEE Transactions on Biomedical Engineering, vol. 65, No. 5, pp. 1002-1013, May 2018, doi: 10.1109/TBME.2017.2734641. (Year: 2018).

(Continued)

*Primary Examiner* — Richard L Bowen
(74) *Attorney, Agent, or Firm* — Banner & Witcoff, Ltd.

(57) ABSTRACT

According to some aspects, disclosed methods and systems may include determining, by a device and based on historical data associated with a first user, a first user profile comprising one or more content recommendation periods each associated with a time period and a content classification, and in response to detecting a user interaction, selecting a first content recommendation period of the one or more content recommendation periods. The methods and system may also include determining one or more content candidates corresponding to the content classification from a plurality of content assets based on an amount of remaining time in the time period associated with the first content recommendation period and a correlation between the historical data associated with the first user and one or more contextual features associated with the plurality of content (Continued)

assets, and transmitting, to a client device, an indication of the one or more content candidates.

21 Claims, 5 Drawing Sheets

(56) References Cited

U.S. PATENT DOCUMENTS

| | | |
|---|---|---|
| 7,680,959 B2 | 3/2010 | Svendsen |
| 7,757,250 B1 | 7/2010 | Horvitz et al. |
| 8,095,432 B1 | 1/2012 | Berman et al. |
| 8,180,804 B1 | 5/2012 | Narayanan et al. |
| 8,291,321 B2 | 10/2012 | Matsubayashi |
| 8,302,127 B2 | 10/2012 | Klarfeld et al. |
| 8,397,257 B1 | 3/2013 | Barber |
| 8,554,640 B1 | 10/2013 | Dykstra et al. |
| 8,555,177 B1 | 10/2013 | Junee et al. |
| 8,677,415 B2 | 3/2014 | Angiolillo et al. |
| 8,692,763 B1 | 4/2014 | Kim |
| 8,782,121 B1 | 7/2014 | Chang |
| 8,782,122 B1 | 7/2014 | Chang |
| 8,793,735 B2 | 7/2014 | VanDuyn et al. |
| 8,856,833 B2 | 10/2014 | Conness et al. |
| 8,943,529 B2 | 1/2015 | Kardatzke |
| 9,147,000 B2 | 9/2015 | Vasudevan et al. |
| 9,183,523 B2 | 11/2015 | Cudak et al. |
| 9,246,613 B2 | 1/2016 | McKee et al. |
| 9,247,300 B2 | 1/2016 | Oddo et al. |
| 9,277,472 B1 | 3/2016 | Price et al. |
| 9,342,576 B2 | 5/2016 | Saito et al. |
| 9,407,751 B2 | 8/2016 | Hansen et al. |
| 9,426,509 B2 | 8/2016 | Ellis et al. |
| 9,554,163 B2 | 1/2017 | Ellis et al. |
| 9,626,875 B2 | 4/2017 | Gal et al. |
| 9,826,034 B2 | 11/2017 | Chang |
| 9,832,501 B2 | 11/2017 | Ruffini et al. |
| 10,034,051 B2 | 7/2018 | Card, II |
| 2002/0004742 A1 | 1/2002 | Willcocks et al. |
| 2002/0004748 A1 | 1/2002 | Koga et al. |
| 2002/0085024 A1 | 7/2002 | White et al. |
| 2002/0152224 A1 | 10/2002 | Roth et al. |
| 2002/0152459 A1 | 10/2002 | Bates et al. |
| 2002/0199188 A1 | 12/2002 | Sie et al. |
| 2003/0084448 A1 | 5/2003 | Soundararajan |
| 2003/0145338 A1 | 7/2003 | Harrington |
| 2003/0233278 A1 | 12/2003 | Marshall |
| 2004/0031046 A1 | 2/2004 | Weinblatt et al. |
| 2004/0122736 A1 | 6/2004 | Strock et al. |
| 2004/0203901 A1 | 10/2004 | Wilson et al. |
| 2004/0230484 A1 | 11/2004 | Greenlee |
| 2004/0244030 A1 | 12/2004 | Boyce et al. |
| 2005/0049858 A1 | 3/2005 | Busayapongchai |
| 2005/0114340 A1 | 5/2005 | Huslak et al. |
| 2005/0192000 A1 | 9/2005 | Lloyd |
| 2006/0031882 A1 | 2/2006 | Swix et al. |
| 2006/0041478 A1 | 2/2006 | Zheng |
| 2006/0047678 A1 | 3/2006 | Miyazaki et al. |
| 2006/0048184 A1 | 3/2006 | Poslinski et al. |
| 2006/0143236 A1 | 6/2006 | Wu |
| 2006/0143653 A1 | 6/2006 | Suh |
| 2006/0149617 A1 | 7/2006 | Yamashita et al. |
| 2006/0156329 A1 | 7/2006 | Treese |
| 2006/0176398 A1 | 8/2006 | Kang |
| 2006/0225088 A1 | 10/2006 | Gutta |
| 2006/0277100 A1 | 12/2006 | Parham |
| 2007/0061863 A1 | 3/2007 | Rajasekaran |
| 2007/0154168 A1 | 7/2007 | Cordray et al. |
| 2007/0192723 A1 | 8/2007 | Anzelde et al. |
| 2007/0196795 A1 | 8/2007 | Groff |
| 2007/0207780 A1 | 9/2007 | McLean |
| 2007/0294131 A1 | 12/2007 | Roman et al. |
| 2008/0055272 A1 | 3/2008 | Anzures et al. |
| 2008/0083001 A1 | 4/2008 | Peacock et al. |
| 2008/0177617 A1 | 7/2008 | Gupta |
| 2008/0209229 A1 | 8/2008 | Ramakrishnan et al. |
| 2008/0243733 A1 | 10/2008 | Black |
| 2008/0276273 A1 | 11/2008 | Billmaier et al. |
| 2008/0320139 A1 | 12/2008 | Fukuda et al. |
| 2009/0019375 A1 | 1/2009 | Garofalo |
| 2009/0083116 A1 | 3/2009 | Svendsen |
| 2009/0083779 A1 | 3/2009 | Shteyn et al. |
| 2009/0089352 A1 | 4/2009 | Davis et al. |
| 2009/0100463 A1 | 4/2009 | St. John-Larkin |
| 2009/0119294 A1 | 5/2009 | Purdy et al. |
| 2009/0132935 A1 | 5/2009 | Van Zwol |
| 2009/0144635 A1 | 6/2009 | Miyazaki et al. |
| 2009/0158326 A1 | 6/2009 | Hunt et al. |
| 2009/0172161 A1 | 7/2009 | Singh |
| 2009/0216577 A1 | 8/2009 | Killebrew |
| 2009/0234876 A1 | 9/2009 | Schigel et al. |
| 2009/0281888 A1 | 11/2009 | Zai et al. |
| 2009/0300670 A1 | 12/2009 | Barish |
| 2010/0023506 A1 | 1/2010 | Sahni et al. |
| 2010/0058376 A1 | 3/2010 | Alhadeff et al. |
| 2010/0083115 A1 | 4/2010 | Park |
| 2010/0122207 A1 | 5/2010 | Kim et al. |
| 2010/0138867 A1 | 6/2010 | Wong et al. |
| 2010/0162289 A1 | 6/2010 | Sanders |
| 2010/0229212 A1 | 9/2010 | Liu et al. |
| 2010/0241699 A1 | 9/2010 | Muthukumarasamy et al. |
| 2010/0250341 A1 | 9/2010 | Hauser |
| 2010/0251305 A1 | 9/2010 | Kimble et al. |
| 2010/0318611 A1 | 12/2010 | Curtin et al. |
| 2010/0325544 A1 | 12/2010 | Alhadeff et al. |
| 2010/0325646 A1 | 12/2010 | Alhadeff et al. |
| 2010/0332330 A1 | 12/2010 | Goel et al. |
| 2011/0035445 A1 | 2/2011 | Eickhoff |
| 2011/0124408 A1 | 5/2011 | Ward |
| 2011/0154213 A1 | 6/2011 | Wheatley et al. |
| 2011/0161148 A1 | 6/2011 | Schmidt |
| 2011/0184792 A1 | 7/2011 | Butcher et al. |
| 2011/0231265 A1 | 9/2011 | Brown et al. |
| 2011/0264494 A1 | 10/2011 | Lechowicz |
| 2011/0276882 A1 | 11/2011 | Buehler et al. |
| 2011/0312375 A1 | 12/2011 | Kim et al. |
| 2012/0047008 A1 | 2/2012 | Alhadeff et al. |
| 2012/0064820 A1 | 3/2012 | Bemmel |
| 2012/0089705 A1 | 4/2012 | French et al. |
| 2012/0243850 A1 | 9/2012 | Basra et al. |
| 2013/0046772 A1 | 2/2013 | Gu et al. |
| 2013/0057765 A1 | 3/2013 | Zeleznikar |
| 2013/0103628 A1 | 4/2013 | Skelton et al. |
| 2013/0125161 A1 | 5/2013 | Herby et al. |
| 2013/0268966 A1 | 10/2013 | Foote |
| 2013/0297447 A1 | 11/2013 | Sakata |
| 2013/0322850 A1 | 12/2013 | Chang et al. |
| 2013/0325655 A1* | 12/2013 | Wouhaybi .......... G06Q 30/0631 705/26.7 |
| 2014/0019902 A1 | 1/2014 | DeLuca et al. |
| 2014/0033240 A1 | 1/2014 | Card, II |
| 2014/0046660 A1 | 2/2014 | Kamdar |
| 2014/0075385 A1 | 3/2014 | Wan et al. |
| 2014/0123160 A1 | 5/2014 | van Coppenolle et al. |
| 2014/0130076 A1 | 5/2014 | Moore et al. |
| 2014/0132524 A1 | 5/2014 | Lee |
| 2014/0149424 A1 | 5/2014 | Kalmes et al. |
| 2014/0173435 A1 | 6/2014 | Arnold |
| 2014/0201766 A1 | 7/2014 | Stepanov et al. |
| 2014/0215506 A1 | 7/2014 | Kalmes et al. |
| 2014/0331260 A1 | 11/2014 | Gratton |
| 2015/0003595 A1 | 1/2015 | Yaghi et al. |
| 2015/0012416 A1 | 1/2015 | Woods |
| 2015/0066652 A1 | 3/2015 | Collins et al. |
| 2015/0089517 A1 | 3/2015 | Ruffini et al. |
| 2015/0121408 A1 | 4/2015 | Jacoby et al. |
| 2015/0133164 A1 | 5/2015 | Song et al. |
| 2015/0143394 A1 | 5/2015 | Hijikata et al. |
| 2015/0148005 A1 | 5/2015 | Chau et al. |
| 2015/0169189 A1 | 6/2015 | Want et al. |
| 2015/0195621 A1 | 7/2015 | Harron et al. |
| 2015/0199708 A1 | 7/2015 | Ying et al. |
| 2015/0287219 A1 | 10/2015 | Liang et al. |

(56) References Cited

U.S. PATENT DOCUMENTS

| | | | |
|---|---|---|---|
| 2015/0319468 A1 | 11/2015 | Park et al. | |
| 2015/0350709 A1 | 12/2015 | Tomita | |
| 2016/0063998 A1 | 3/2016 | Krishnamoorthy et al. | |

FOREIGN PATENT DOCUMENTS

| | | |
|---|---|---|
| WO | 2007143562 A2 | 12/2007 |
| WO | 2011002572 A1 | 1/2011 |

OTHER PUBLICATIONS

Entertainment Fiend: Keep Track of Watched TV Show Episodes and Movies and Plan What to Watch! dated Apr. 11, 2008, http://entertainmentfiend.blogspot.com/2008/04/keep-track-of-watched-tv-show-episodes.html, retrieved Jul. 31, 2014, 4 pages.
Entertainment Fiend: Keep Track of Watched TV Show & Movies and Plan What to Watch—Updated for 2011 Edition, dated Oct. 13, 2011, http://entertainmentfiend.blogspot.com/2011/10/keeping-track-of-watched-tv-shows.html, retrieved Jul. 31, 2014, 2 pages.
Alan Henry. How to Track All Your TV Shows So You Never Miss an Episode, Lifehacker, http://lifehacker/how-to-track-all-your-tv-shows-so-you-never-miss-an-epi-1180239026, 2013, 11 pages.
Thorin Klosowski. Netflix Profiles Ensure Roommates Won't Mess Up Your Recommendations, Lifehacker, http://lifehacker.com/netflix-profiles-ensure-roommates-wont-mess-up-your-re-987927584, dated Aug. 1, 2013, 11 pages.
European Office Action—EP Appl. 11166793.7—dated Oct. 8, 2015.
Canadian Office Action—CA Application No. 2740650—dated Feb. 28, 2017.
European Summons to Oral Proceedings—EP Appl. 11166793.7—dated Apr. 12, 2017.
Feb. 2, 2018—Canadian Office Action—CA 2,740,650.
EP 11166793.9-221 Search Report dated Aug. 5, 2011.
Feb. 21, 2019—Canadian Office Action—CA 2,740,650.
Mar. 12, 2020—Canadian Office Action—CA 2,740,650.
R. Gaglianello, L. Spergel and D. Liu, "Convergence of telephony and television: More than a computer on your TV," 2009 IEEE International Symposium on Broadband Multimedia Systems and Broadcasting, Bilbao, 2009, pp. 1-7, doi: 10.1109/ISBMSB.2009.5133763. (Year: 2009).
J. B. Carlucci, "Social Media Television in Today's Cable Systems," 2010 7th IEEE Consumer Communications and Networking Conference, Las Vegas, NV, 2010, pp. 1-5, doi: 10.1109/CCNC.2010.5421636. (Year: 2010).
D. C. A. Bulterman, P. Cesar, A. J. Jansen, H. Knoche and W. Seager, "Enabling Pro-Active User-Centered Recommender Systems: An Initial Evaluation," Ninth IEEE International Symposium on Multimedia Workshops (ISMW 2007), Beijing, 2007, pp. 195-200, doi: 10.1109/ISM.Workshops.2007.41. (Year: 2007).
P. Cesar, D. C. A. Bulterman and A. J. Jansen, "Social Sharing of Television Content: An Architecture," Ninth IEEE International Symposium on Multimedia Workshops (ISMW 2007), Beijing, 2007, pp. 145-150, doi: 10.1109/ISM.Workshops.2007.34. (Year: 2007).
M. Schroder et al., "Building Autonomous Sensitive Artificial Listeners," in IEEE Transactions on Affective Computing, vol. 3, No. 2, pp. 165-183, Apr.-Jun. 2012, doi: 10.1109/T-AFFC.2011.34. (Year: 2011).
Aug. 17, 2022—CA Office Action—CA App. No. 3122547.

* cited by examiner

DYNAMIC CONTENT RECOMMENDATIONS

CROSS-REFERENCE TO RELATED APPLICATIONS

This application claims priority to and is a continuation of U.S. application Ser. No. 14/310,327, filed Jun. 20, 2014, the contents of which are incorporated herein by reference in its entirety.

BACKGROUND

Content providers have long sought to determine how to quickly produce accurate content recommendations for users. There is an ever-present need to accurately produce content recommendations that fit into a user's daily schedule, while maximizing the amount of time the user has available to access those content recommendations.

SUMMARY

The following summary is for illustrative purposes only, and is not intended to limit or constrain the detailed description.

One or more aspects of the disclosure provide for a method that may include determining, by a device and based on historical data associated with a first user, a first user profile comprising one or more content recommendation periods each associated with a time period and a content classification; and in response to detecting a user interaction, selecting a first content recommendation period of the one or more content recommendation periods. The method may also include determining one or more content candidates corresponding to the content classification from a plurality of content assets based on an amount of remaining time in the time period associated with the first content recommendation period and a correlation between the historical data associated with the first user and one or more contextual features associated with the plurality of content assets; and transmitting, to a client device, an indication of the one or more content candidates.

One or more aspects of the disclosure also provide for a method that may include determining, by a device and based on historical data associated with a first user and a second user, a first user profile and a second user profile each comprising one or more content recommendation periods associated with a time period and a content classification; and in response to detecting an interaction by the first user or the second user, assigning a first content recommendation period from one of the first user profile and the second user profile. The method may also include determining one or more content candidates corresponding to the content classification from a plurality of content assets based on an amount of remaining time in the time period associated with the first content recommendation period and a correlation between one or more contextual features associated with the plurality of content assets and the historical data associated with at least one of the first user and the second user; and transmitting, to a client device, an indication of the one or more content candidates.

One or more aspects of the disclosure also provide for a method that may include determining, by a device and based on a user interaction and historical data associated with a first user, one or more content recommendation periods; assigning one or more content candidates to the one or more content recommendation periods based on a correlation between the historical data associated with the first user and one or more contextual features associated with the one or more content candidates; and transmitting an indication associated with the one or more content candidates.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, removable storage media, solid state memory, RAM, magnetic storage devices, and/or any combination thereof. In addition, the functionality may be embodied in whole or in part in firmware or hardware equivalents, such as integrated circuits, field programmable gate arrays (FPGAs), and the like. Various signals representing data or events as described herein may be transferred between a source and a destination in the form of electromagnetic waves traveling through signal-conducting media such as metal wires, optical fibers, and/or wireless transmission media (e.g., air and/or space).

Figure 1:
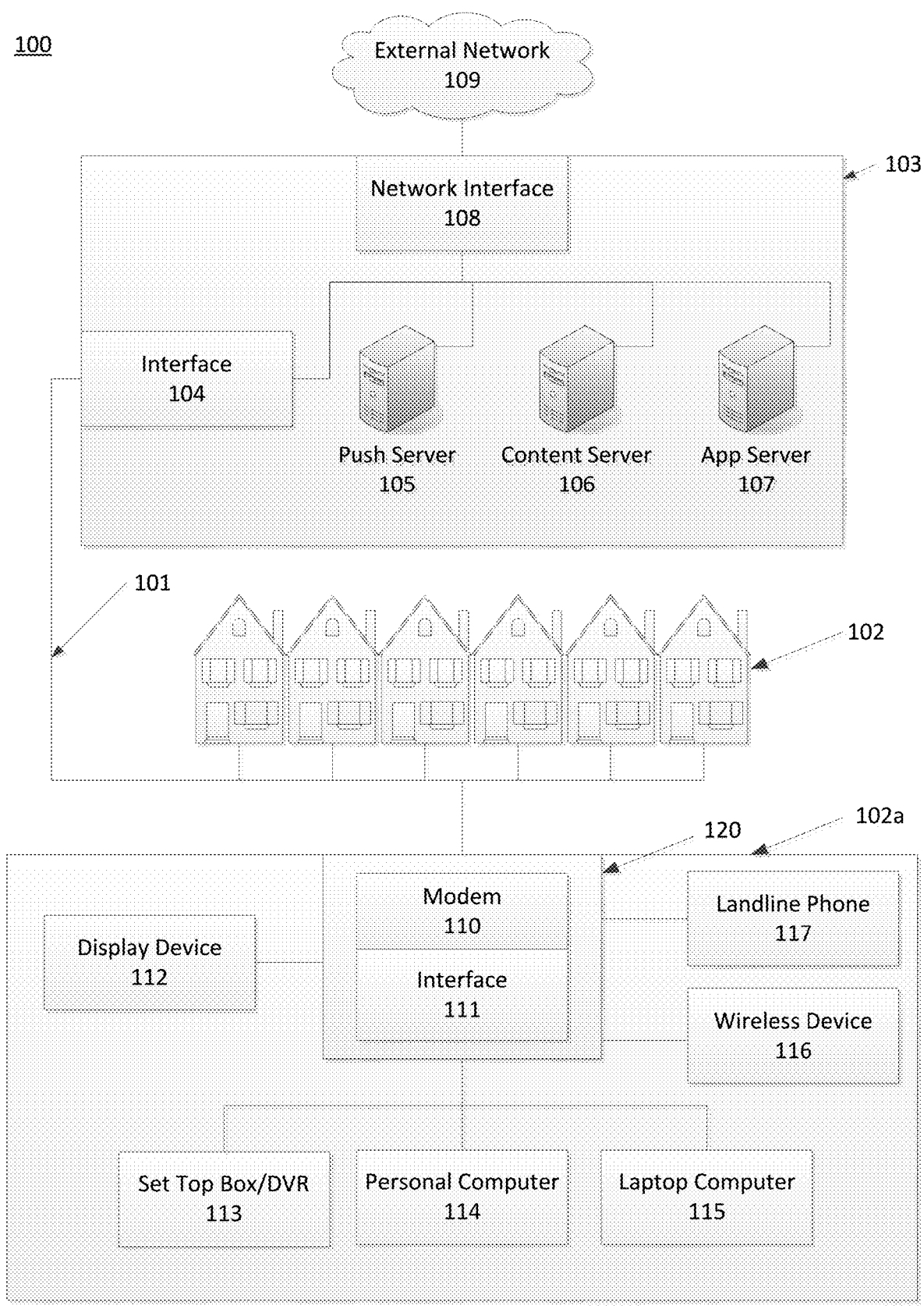
FIG. 1 illustrates an example communication network on which various features described herein may be used.

FIG. 1 illustrates an example communication network 100 on which many of the various features described herein may be implemented. The network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one or more links 101 originating from the local office 103, and it may be split a number of times to distribute the signal to the various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single the local office 103 to reach even farther with its network of the links 101 than before.

The local office 103 may include an interface 104, such as a termination system (TS). More specifically, the interface 104 may be a cable modem termination system (CMTS), which may be a computing device configured to manage communications between devices on the network of the links 101 and backend devices such as the servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include one or more push notification servers 105. The push notification server 105 may generate push notifications to deliver data and/or commands to the various premises 102 in the network (or more specifically, to the devices in the premises 102 that are configured to detect such notifications)

The local office 103 may also include one or more content servers 106. The content server 106 may be one or more computing devices that are configured to provide content to users at their premises. This content may be, for example, advertisements (such as commercials), video on demand movies, television programs, songs, text listings, etc. The content server 106 may include software to validate user identities and entitlements, to locate and retrieve requested content, to encrypt the content, and to initiate delivery (e.g., streaming or downloading) of the content to the requesting user(s) and/or device(s). The content server 106 may also be configured to generate advertising decisions and rules, and transmit them to a requesting user or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. As another example, the application server or another server may be responsible for monitoring user viewing habits and collecting that information for use in selecting advertisements. As another example, the application server or another server may be responsible for formatting and inserting advertisements in, for example a video stream being transmitted to the premises 102. Yet the application server or another application server may be responsible for associating interactive components into and with content and/or advertisements. Although shown separately, one of ordinary skill in the art will appreciate that the push server 105, the content server 106, and the application server 107 may be combined. Further, here the push server 105, the content server 106, and the application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111, such as a gateway, may be a computing device that communicates with the modem(s) 110 to allow one or more other devices in the premises 102a, to communicate with the local office 103 and other devices beyond the local office 103. The gateway interface device 111 may be a set-top box, digital video recorder (DVR), computer server, or any other desired computing device. The gateway interface device 111 may also include (not shown) local network interfaces to provide communication signals to requesting entities/devices in the premises 102a, such as the display devices 112 (e.g., televisions), the additional set-top boxes or the DVRs 113, the personal computers 114, the laptop computers 115, the wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), the landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
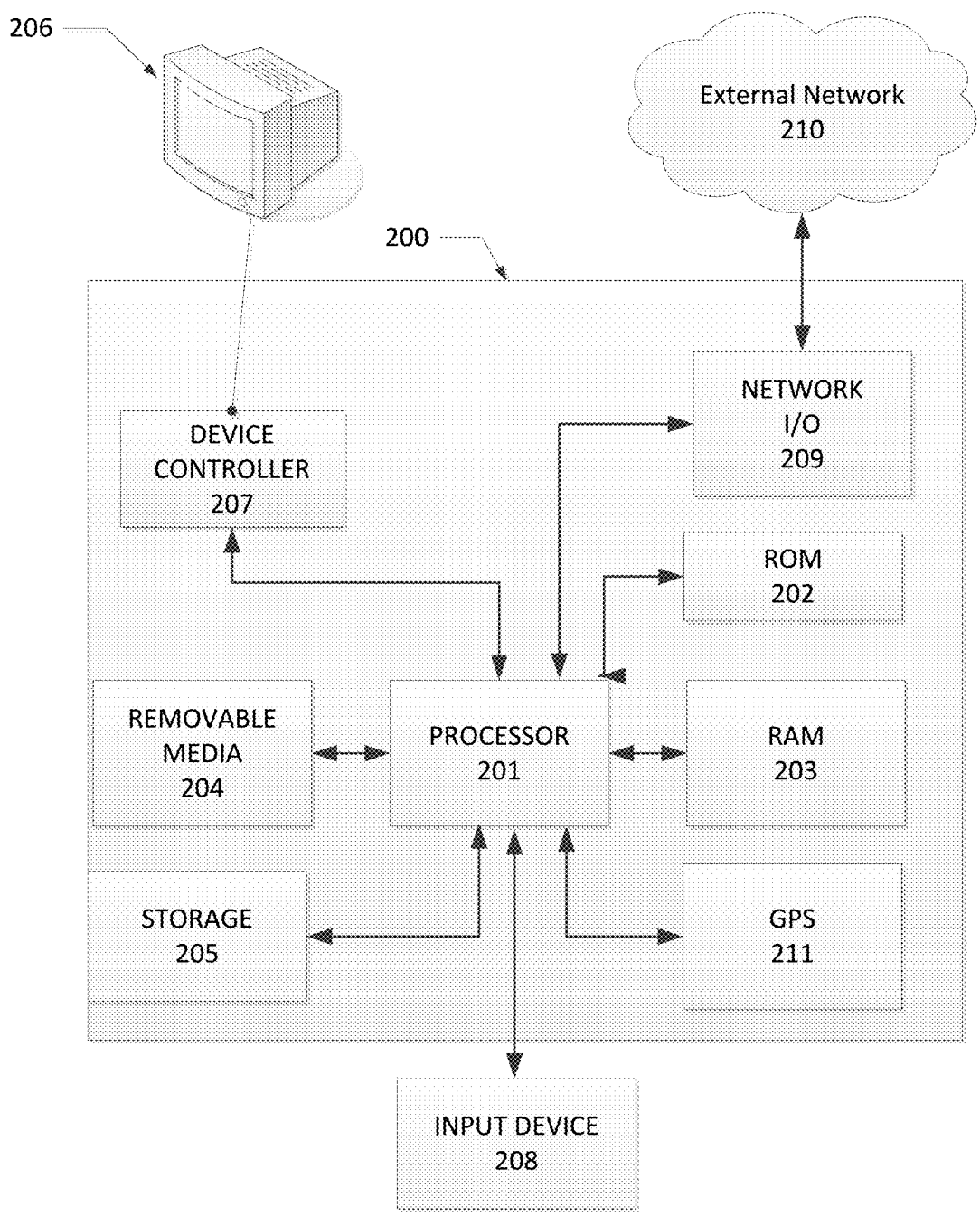
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, compact disk (CD) or digital versatile disk (DVD), floppy disk drive, or any other desired storage medium. Instructions may also be stored in an attached (or internal) storage 205, such as a hard drive. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

FIG. 2 shows an example hardware configuration. Modifications may be made to add, remove, combine, divide, etc., components as desired, and some or all of the elements may be implemented using software. Additionally, the components illustrated may be implemented using basic display devices and components, and the same components (e.g., the processor 201, the ROM 202, the display 206, other input/output devices, etc.) may be used to implement any of the other display devices and components described herein. For example, the various components herein may be implemented using display devices having components such as a processor executing computer-executable instructions stored on a computer-readable medium (e.g., the storage 205), as illustrated in FIG. 2.

Having described examples of network environments and content consumption devices that may be used in implementing various aspects of the disclosure, several examples will now be described in greater detail illustrating how a display device may monitor user actions during an advertisement, a display device may restrict a user's control of the display device during an advertisement, and efficacy file reports are created and used. The consumption device, which may be a user's tablet computer, personal computer, smartphone, DVR, or any other computing device as described herein, may monitor any client-side interaction with the user during an advertisement, such as detecting a change in audio level or order of display elements. In other examples, the display device may prohibit a user from muting an advertisement during play.

Figure 3:
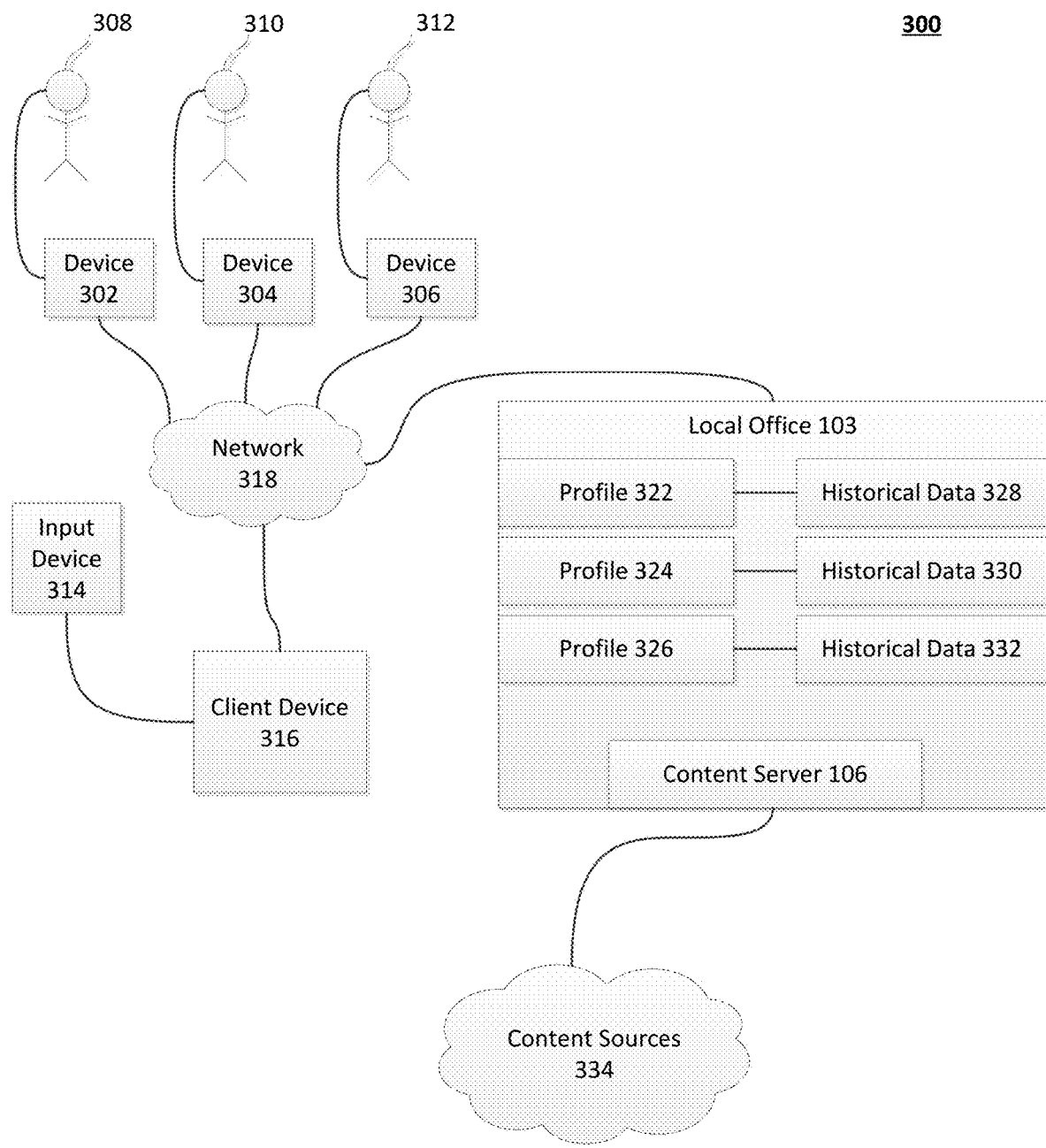
FIG. 3 illustrates an example system in accordance with aspects of the present disclosure.

FIG. 3 illustrates an example system 300 in accordance with one or more disclosed features described herein. The system 300 may include the client device 316. The client device 316 may comprise, be substantially similar to, and/or be the same as computing device 200, as shown in FIG. 2. The client device 316 may comprise, for example, a set-top box 113, personal computer 114, laptop computer 115, gateway 111, modem 110, display device 112, landline phone 117, wireless device 116, a mobile device (smartphone, tablet, smartwatch, Bluetooth, etc.), digital video recorder (DVR), digital video player, audio device, or any other device capable of providing or accessing media and/or content, or combinations thereof. The client device 316 may be operably connected to an input device 314, which may comprise a remote control, keyboard, mouse, touch screen, microphone, or the like used to control and access features of the client device 316. The input device 314 $m$ may comprise, be substantially similar to, and/or be the same as input device 208, as shown in FIG. 2. One or more users, such as the user 308, the user 310, and the user 312, may interact with the input device 314 and/or the client device 316. The users 308, 310, and 312 may also interact and/or be associated with one or more computing devices, such as the computing devices 302, 304, and 306. The computing devices 302, 304, and 306 may comprise, be substantially similar to, and/or be the same as computing device 200, as shown in FIG. 2. The computing devices 302, 304, and 306 may comprise, for example, a set-top box 113, personal computer 114, laptop computer 115, gateway 111, modem 110, display device 112, landline phone 117, wireless device 116, a mobile device (smartphone, tablet, smartwatch, Bluetooth, etc.), digital video recorder (DVR), digital video player, audio device, or any other device capable of providing or accessing media and/or content, or combinations thereof.

The client device 316 may be operably connected to the local office 103 via a network 318. The network 318 may comprise, be substantially similar to, and/or be the same as network 100, link 101, external network 109, and/or external network 210 as shown in FIGS. 1 and 2. The network 318 may be, for example, a wireless network, a MoCA in-home coaxial cable network, a cellular network, an Ethernet network, a Wi-Fi network, and the like. The local office 103, which may be associated with a head end, may provide content to the client device 316 via the network 318. The local office 103 may include and/or be associated with one or more profiles, such as the user profile 322, the user profile 324, and the user profile 326. Each user profile may be associated with the users 308, 310, or 312. Each user profile may be associated with a user's historical data, such as the historical data 328, the historical data 330, and the historical data 332 (each of which may correspond to the users 308, 310, and 312). It is noted that while the local office 103 is shown in FIG. 3 to include profiles 322, 324, and 326 along with the historical data 328, 330, and 332, profiles 322, 324, and 326 and the historical data 328, 330, and 332 may be included in and/or associated with other components, such as the client device 316. As previously shown in FIG. 1, the local office 103 may include one or more content servers 106. The local office 103 (e.g., via the content server 106) may also access and retrieve content from one or more content sources 334, such as internet content sources, music content sources, or video content sources, for transmission to one or more devices, such as the client device 316.

Each component of the system 300 may be operably connected to and/or interact with each other via a direct and/or indirect connection, such as via a network or hardwire. Each component of the system 300 may be affiliated, operably connected to, and/or located at a service or content provider, such as the local office 103.

FIG. 3 illustrates one client device 316, however, any number of client devices, such as two, ten, or a hundred, may be included in the system 300 and/or in any of the embodiments disclosed herein. The client device 316 may be located at a location, such as premises 102*a*. Additionally, client devices may be located at a same or similar location, such as premises 102*a*, or may be located at different locations. The client device 316 may provide and/or access content services, such as video/image content services, audio content services, internet content services, and the like. The client device 316 may access content services and other services via, for example, a video processor or audio processor (e.g., similar to device controller 207) and may display content on a display (e.g., similar to display 206 as shown in FIG. 2). For example, the client device 316 may launch an application on the client device 316, and access content via the launched application. The client device 316 may access content on any number of content platforms, which may include a linear content platform, media (video/audio) on-demand content platform, mobile content platform, a service provider-specific content platform, an online content platform, or other content platform that may be capable of providing content on the client device 316, or combinations thereof. For example, the client device 316 may be a mobile device, and may provide content, such as a movie, through a mobile application. In such a scenario, the content may be provided through a mobile content platform. In another example, the client device 316 may be a set-top box, and may provide content, such as a television program or show, via linear content (e.g., live broadcast). In such a scenario, the content may be provided through a linear content platform. In yet another example, the client device 316 may be a set-top box, and may provide content, such as a song, using a media on-demand content platform, and/or may provide content, such as an internet video, using an online content platform. A service provider may provide content that may be specific for that service provider with the service provider's own content platform. For example, content provided on a service provider content platform may be customized by a service provider for a particular client device and/or user, such as providing a user's favorite part of a movie, recommended scene of a movie, and the like. Additionally, content provided on a service provider content platform may be a combination of various other platforms, such as combining online content with linear or video on-demand content.

Users 308, 310, and 312 may access content from the client device 316. For example, the user 308 may request access to a movie on a set-top box, and subsequently watch the movie on a display connected to the set-top box. In this example, the user 308 may use an input device 314 (such as a remote control) to request access to the movie on the set-top box. According to some aspects, the local office 103 may then determine and/or access the historical data 328, 330, and 332 corresponding to each of the users 308, 310, and 312. The historical data 328 may include the viewing patterns and/or behavior of the user 308, as well as features of any viewed/accessed content, such as the content's metadata and/or contextual features (e.g., state of the content and the actual information embedded in the content). In addition, the historical data 328 may also include the relationship between metadata or contextual information from a show and how they affect the viewing patterns or behavior of the user 308.

The historical data 328 (e.g., metadata and/or contextual features of content and/or behavior of a user) may include the time or date associated with an accessed content item (such as if a show comes on at 21:00), a particular day of the week associated with a content item (such as if a new episode of a show only comes on Tuesdays), whether there are any exciting moments or events in the content (such as the number of highlight plays in a football game), or other descriptive information for content (such as a score of a football game at any point during the football game). Other information that may be included in the historical data 328 may include the name or description of the content item, the content item's platform or channel, content item's location (e.g., IP address), a category/type/classification for the content (such as kids, movie, sports, drama, sitcom, comedy, news, and the like), whether the content is broadcasted live, and the like. The historical data 328 may also include a DVR list of content for a user, which shows the user typically records, which shows the user typically watches live. The historical data 328 may also include which applications the user accesses (such as a news, traffic, weather, shopping, gaming, fantasy sports, or music application) and what time the user accesses those applications.

Contextual information may include any descriptive information regarding what is actually happening in a show or application. For example, if a user is watching a football game, contextual information may include that the user's favorite team is losing 49-7 and the game is in the second quarter. In such a situation, if the user then opts to change to another program, then the user's behavior may be determined to include changing the channel when the user's favorite team is losing 49-7 in the second quarter. The user's favorite team may be determined by any number of factors, such as a correlation between the location associated with a team and of the user, how many games the user has watched of a particular team, and whether the user has input the user's favorite team into the client device 316 and/or the local office 103. It is noted that while the user 308 and the user 308's historical data 328 are used in the above examples, other users, such as the users 310 and 312, and their historical data, such as the historical data 330 and 332, may also be used in the examples and embodiments disclosed herein. In addition, the historical data 328 (e.g., information regarding the user 308's behavior) may also include whether the user 308 watched a show for the entire scheduled length of the show (or accessed a song for the entire length of the song), which portion of a show the user watched (e.g., beginning, middle, end), how much of a show a user watched (e.g., 20% or 50%), whether and at which point during the show the user stopped accessing the show and/or changed to another show. A user's historical data will be described below in more detail.

Using the historical data 328, 330, and 332, the local office 103 may then create and/or store one or more user profiles 322, 324, and 326 which may correspond to each of the users 308, 310, and 312. A user profile 322 may include a schedule describing when and/or at what times during a period of time (e.g., an hour, day, week, month, year, etc.) the user 308 accesses/watches content. For example, the user profile 322 may include a schedule detailing which parts of the day the user 308 tends to access or frequently accesses content (such as time periods during the day), and which types of content the user 308 tends to watch or frequently watches during those parts of the day (such as watching kids programing from 16:00 to 17:00). Tending to access content may describe a situation in which the user 308 accesses a content a larger part of the time (such as 20%, 50%, 70%, and 90% of the time and the like).

The user profile 322 may include different schedules for different time periods, such as a different schedule for each day of the week. For example, if the user 308 tends to watch professional football on Mondays from 19:00-22:00, Thursdays at 20:00-23:00, and Sundays at 19:00-22:00, then a schedule for Monday, Thursday, and Sunday may include professional football on Mondays from 19:00-22:00, Thursdays at 20:00-23:00, and Sundays at 19:00-22:00. Consequently, a schedule for Tuesday, Wednesday, Friday, and Saturday may not include professional football, and may contain other content types beginning at 20:00 or 21:00 on those days. Additionally, some content items may only be accessible during particular times of the year, such as professional American football being available August through February. Thus, a profile may be updated to reflect any seasonal variation in content programing. Also, the local office 103 may create and maintain a profile for one or more devices associated with a user. For example, the local office 103 may create a profile for the user 308 for a set-top box, a separate profile for the user 308 for a smartphone, and a separate profile for the user 308 for a tablet. It is noted that while the user 308 and the user 308's profile 322 are used in the above examples, other users, such as users 310 and 312 and their corresponding profiles (e.g., profiles 324 and 326) may also be used in the examples and embodiments disclosed herein. A user's profile will described below in more detail.

Figure 4:
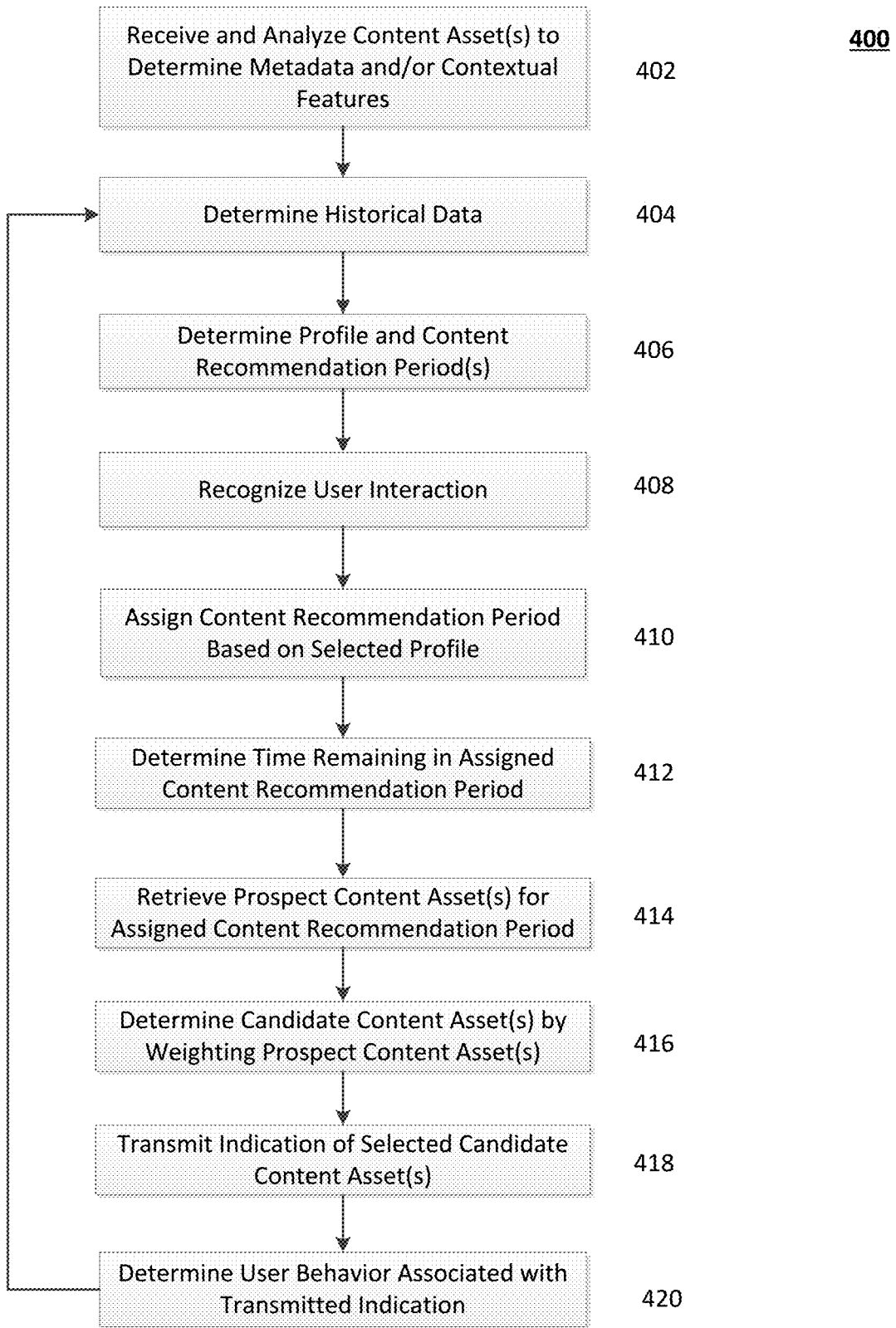
FIG. 4 illustrates an example flow diagram of a method in accordance with aspects of the present disclosure.

FIG. 4 is an exemplary flow diagram illustrating an example process 400 in accordance with one or more disclosed features described herein. In one or more embodiments, the process illustrated in FIG. 4 and/or one or more steps thereof may be performed by one or more computing devices (e.g., the input device 314, the client device 316, computing devices, 302, 304, and 306, the local office 103, one or more content providers, and the like). In other embodiments, the process illustrated in FIG. 4 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

In the example provided, the process 400 may begin with step 402, in which the local office 103 may receive and analyze one or more content assets to determine various types of metadata for those content assets. The metadata may include contextual features of the content, such as information that describes what is happening or what happened during a show, or what is happening or happen in an accessed application. For example, contextual features for a football game may include the number of highlight plays that happened during the game (such as if the ball advanced 20 yards, then it is a highlight play), the score at any particular point during the game, which teams are playing, which team is winning, whether there is a blowout score (which may be based on a threshold, such as over 21 points), whether it is raining or snowing, whether an unusual event happened during the game (such as an injury or fan running onto the field), whether the game lasted longer than an expected length of time, whether the game went into overtime, what time is left, which quarter the game is in, and the like. In another example, the user 308 may access a gaming application on the client device 316 and may play a video game with the gaming application. Thus, contextual features for the video game and/or gaming application may include whether the user did well or poorly in the video game (e.g., won or lost the game), the score in the video game, the game level of the video game, how many points a user obtained during a video session, and the like. It is noted that the analyzed content assets may include assets configured for any content platform, such as internet, linear, DVR, on-demand, music, and applications (e.g., traffic, weather, social media). Additional metadata may include whether an episode of a show is a new or repeated episode and a content classification (such as kids, sports, movie, drama, adult, news, etc.). The metadata may also include the time and day the content asset may be broadcasted live by the local office 103.

The contextual information may include whether a show deviated from how the show is expected to happen. For example, a children's television show, such as SpongeBob Square Pants, may not have a lot of contextual variance from episode to episode (e.g., follows the same general story with little to no deviation between episodes). Thus, contextual features may generally be the same from episode to episode. However, as in the above football example, one football game may be completely different than another football. For example, the teams may be different, the score may be different, the number and types (e.g., highlights, running plays, passing plays, etc.) of plays may be different, the games' weather may be different, and the like. Thus, there may be more contextual variance between the contextual features of different sporting events. Similarly, a drama, such as Downton Abbey, may generally follow a similar storyline with each episode, but, there may some variation between different episodes of Downton Abby (e.g., someone was killed in an episode, someone was married in an episode, a party happened in an episode, etc.).

At step 404, the local office 103 may determine, gather, and/or analyze historical data (e.g., the historical data 328) for a user (e.g., the user 308). The historical data 328 may include the content viewing patterns and/or behavior of the user 308 regarding how the user 308 accesses content. For example, a user 308 may access a weather or traffic application on the client device 316 at the user's house (e.g., premises 102*a*) every weekday morning at 07:00 before the user 308 leaves to go to work. Thus, the user 308's historical data 328 may include that the user accesses a weather or traffic application every weekday morning at 07:00. If the user 308 then accesses a news program such as the Today Show at 07:30 until the user 308 leaves for work at 08:00, the historical data 328 may reflect that the user typically watches a news program (which may specifically be the Today Show) from 07:30-08:00 on weekdays.

In some embodiments, the local office 103 may obtain other information from the user 308, such as a location of the user. In one example, the local office 103 may obtain location information using a GPS device associated with the user 308 (such as found in the client device 316, the computing device 302, or a vehicle used by the user 308). Thus, after the user 308 leaves for work at 08:00, the local office 103 may determine how long it takes the user 308 to arrive at a destination (e.g., an office building). All of this information (such as location information, timing information, user behavior, etc.) may be included in the historical data 328. Additionally, the historical data 328 may also reflect whether the user accessed any content on the way to work.

In some embodiments, the local office 103 may determine historical data for a particular the client device 316. In such cases, the historical data may not directly correspond with the particular viewing habits and behavior of a specific user 308, but may correspond with one or more users' behavior regarding accessing content on that particular the client device 316. For example, a family may include a dad (the user 308), a mom (the user 310), a child (the user 312), and the family may own and access a set-top box (the client device 316). The dad may access on the client device 316 a weather or traffic application at 07:00 every weekday, the mom and dad may access a news program (The Today Show) from 07:30-08:00 every weekday, the dad may pick up the child from school, come home, access a kids program (SpongeBob) from 16:30-17:00 every weekday, the dad may access a gaming application from 17:00-18:00 every weekday, the mom and dad may access the evening local news from 18:00-19:00 every weekday, the dad may access a sporting event (football game) from 19:00-22:00, and the mom may access a drama or reality show (Downton Abbey or The Voice) from 22:00-23:00. Thus, the historical data for the client device 316 may reflect all of the above information.

In some embodiments, content may be accessed on different platforms, such as DVR, on-demand (music or video), linear, and the like. For example, the user 308 may watch SpongeBob at 16:30 using a video on-demand platform on weekdays. Thus, the historical data 328 may reflect that the user 308 tends to watch SpongeBob at 16:30 using a video on-demand platform on weekdays. In some embodiments, the local office 103 may gather historical information from scheduled and previously scheduled recordings found on a user's DVR. For example, the user 308 may record The Today Show from 08:00-09:00 using a DVR and watch the recorded segment from 17:00-18:00 every weekday. Thus, the historical data 328 may reflect that the user 308 tends to record the Today Show from 08:00-09:00 using a DVR and watch the recorded segment from 17:00-18:00 every weekday.

In some embodiments, the user 308 may vary the length of time the user 308 accesses a particular content item. For example, the user 308 may tend to watch a recording of the Today Show 17:00-18:00 every weekday. However, if there is a cooking segment during the recorded broadcast of the Today Show, the user may tend to stop accessing the recording (e.g., stopping the recording) when that cooking segment approaches or happens, and may tend to switch to a 24 hour news channel (e.g., MSNBC) until 18:00. At 18:00, the user 308 may then tend to watch the local evening news until 19:00. Thus, the historical data 328 may reflect that the user 308 tends to watch a recording of the Today Show 17:00-18:00 every weekday, but if there is a cooking segment during the recording, the user tends to switch from the recording and watch a 24 hour news channel (e.g., MSNBC) until 18:00, and then the local evening news from 18:00-19:00. The local office 103 may use contextual features of the recorded content item (e.g., the Today Show) to determine that the user 308 tends to stop watching the recording if there is a cooking segment. For example, the local office 103 may determine all of the times that the user 308 has stopped watching the recording of the Today Show. The local office 103 may then look to the contextual features of all of those recordings in which the user 308 stopped watching. The local office 103 may then determine that there are similarities between the episodes, such as all (or most) of the episodes contain a cooking segment. The local office 103 may also determine at which point during the playback of the recording the user 308 stop accessing a recording. The local office 103 may also determine which events happened immediately before and immediately after the point in which the user 308 stopped accessing the recording to assess any pattern or trend in the user's behavior. Thus, the local office 103 may determine, over the course of several recordings in which the user 308 stopped accessing, which contextual features (such as cooking segments) are most common in the recordings in which the user 308 stopped accessing.

In some embodiments, the user 308 may access applications on the client device 316. Such applications may include internet applications, weather or traffic applications, music applications, fitness applications, social media applications, picture sharing application, gaming application, shopping applications, fantasy sports applications, and the like. In such situations, the local office 103 may include in the historical data 328 which applications the user 308 may have accessed, and when the user 308 accessed the applications. Also, the local office 103 may also determine contextual features of content from the applications. For example, the local office 103 may determine to which types of music the user 308 listens and at which times the user 308 listens to certain types of music. The local office 103 may determine at what point in a song a user changes to another application or song.

In some embodiments, external environmental factors, such as traffic and weather, may affect a user's behavior in regard to accessing content. For example, the local office 103 may determine (and store as the historical data 328) that after the user 308 checks a traffic application, if the traffic for the user 308's commute is good for that day, then the user 308 may listen to music, access an application, or access content for a longer period (e.g., longer than a scheduled time period) than the user 308 would if the traffic was not good for that day. In a similar example, the local office 103 may determine (and store as the historical data 328) that after the user 308 checks a weather application, if the weather is good for that day before the user 308 leaves for the user's commute to work, then the user 308 may listen to music, access an application, or access content for a longer period than the user 308 would if the weather was not good for that day.

In another example, the local office 103 may determine (and store as the historical data 328) that when the user 308 is accessing a gaming application on the client device 316, such as playing a video game, that if the user 308 is doing well in the video game (e.g., by examining contextual features, such as score, lives, etc. of the video game), then the user 308 tends to keep playing the video game and not access other content on the client device 316. Additionally, the local office 103 may determine that when the user 308 is doing poorly in the video game, then the user 308 tends to abandon the video game, and access other content on the client device 316. In another example, the local office 103 may determine (and store as the historical data 328) that when the user 308 is accessing a shopping application, the user tends to concurrently access content with little contextual variance from episode to episode (e.g., content that may follow the same general story with little to no deviation between episodes), such as SpongeBob Square Pants, instead of content with more contextual variance, such as a sporting event. The local office 103 may also determine that the user 308 tends to pause (or stop accessing) the concurrently accessed content (e.g., SpongeBob) when the user 308 desires to access, view, and/or buy an item using the shopping application.

At step 406, the local office 103 may use historical data obtained in step 404 to determine a user profile describing which types of content (e.g., sports, news, drama, movie, traffic, gaming, etc.) a user tends to access and which times and days/dates the user tends to access those types of content. The user profile (e.g., the user profile 322) may correspond to a user (e.g., the user 308) and/or a user's historical data (e.g., the historical data 328). Thus, the local office 103 may analyze and/or use the historical data 328 to determine and/or create a user profile 322 for the user 308. The user profile 322 may be composed of one or more content recommendation periods. Each content recommendation period may correspond to a time/time period and/or a content type/classification. Each content recommendation period may also correspond to a day or date.

For example, after analyzing the historical data 328, the local office 103 may determine that the user 308 (or the client device 316) tends to access on the client device 316 a traffic application at 07:00 every weekday, access a news program from 07:30-08:00 every weekday, access a kids program from 16:30-17:00 every weekday, access the evening local news from 18:00-19:00 every weekday, access a sporting event from 19:00-22:00 on Sundays, Mondays, and Thursdays, and access a drama from 22:00-23:00 every weekday. A shown in the above example, a content recommendation period may correspond to a particular day of the week (such as the sporting event being on Sundays, Mondays, and Thursdays). Also, a content recommendation period may correspond to a period of time (such as the kids program from 16:30-17:00) or a particular start time with no particular end time (such as the traffic application at 07:00).

Figure 5:
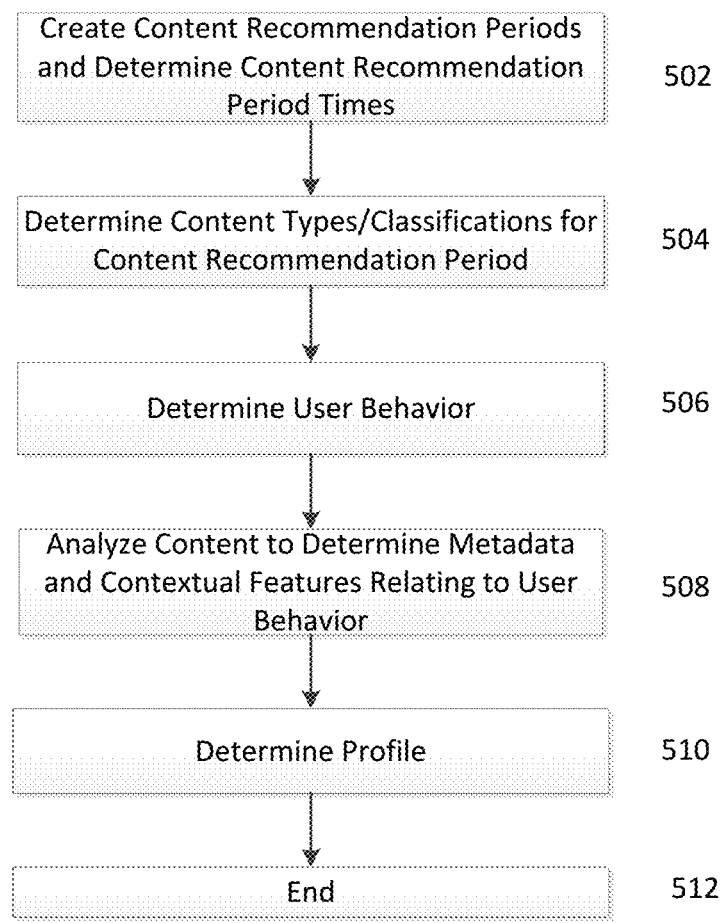
FIG. 5 illustrates an example flow diagram of a method in accordance with aspects of the present disclosure.

FIG. 5 is an exemplary flow diagram illustrating an example process 500 detailing exemplary steps for determining a profile, as described in step 406 in FIG. 4. In one or more embodiments, the process illustrated in FIG. 5 and/or one or more steps thereof may be performed by one or more computing devices (e.g., the input device 314, the client device 316, computing devices, 302, 304, and 306, the local office 103, one or more content providers, and the like). In other embodiments, the process illustrated in FIG. 5 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

FIG. 5 may begin at step 502, in which the local office 103, using the historical data 328, may create one or more content recommendation periods and determine for each content recommendation period a corresponding time period, which may, for example, be segments or portions of a day. The content recommendation periods may be of equal lengths (e.g., 30 minutes each) or of non-equal length (e.g., 15 minutes, 30 minutes, and 1 hour content recommendation periods). For example, the user 308 may tend to access content on the client device 316 at 07:00 every weekday, from 07:30-08:00 every weekday, from 16:30-17:00 every weekday, from 18:00-19:00 every weekday, from 19:00-22:00 on Sundays, Mondays, and Thursdays, and from 22:00-23:00 every weekday. Thus, using this historical data 328 of the user 308, the local office 103 may determine that as part of the user profile 322 for the user 308, content recommendation periods may be made for 07:00 every weekday, from 07:30-08:00 every weekday, from 16:30-17:00 every weekday, from 18:00-19:00 every weekday, from 19:00-22:00 on Sundays, Mondays, and Thursdays, and from 22:00-23:00 every weekday. In some embodiments, content recommendation period times may be made for particular days, such that content recommendation period times may be made for any day of the week, month, or year. In some embodiments, content recommendation period times may be of varying length.

According to some aspects, the local office 103 may dynamically change content recommendation period times as the local office 103 receives additional historical data 328. For example, if the user 308 begins to watch a sports talk show some weekdays from 07:15-08:00 instead of watching a news program from 07:30-08:00, then the local office 103 may use this additional historical data (e.g., the user 308 watching a sports talk show some weekdays from 07:15-08:00) in determining whether to implement a content recommendation period time from 07:15-08:00 instead of 07:30-08:00 for those weekdays. Additionally, content recommendation periods may be seasonal. For example, the user 308 may watch professional football from 19:00-22:00 on Sundays, Monday, and Thursdays during the professional football season (e.g., from August-February), but may tend to only access movie content from 19:00-20:00 and 21:00-22:00 on Sundays, Monday, and Thursdays during the months of March-July. Thus, the local office 103 may assign content recommendation period times to reflect the change of content seasons (such as sports seasons, sitcom seasons, and the like).

At step 504, the local office 103 may determine content types/classifications, such as for each determined content recommendation period time of the day. For example, the local office 103 may determine that the user 308 (or the client device 316) tends to access on the client device 316 a traffic application at 07:00 every weekday, access a news program from 07:30-08:00 every weekday, access a kids program from 16:30-17:00 every weekday, access the evening local news from 18:00-19:00 every weekday, access a sporting event from 19:00-22:00 on Sundays, Mondays, and Thursdays, access a drama from 22:00-23:00 every weekday, and access a movie from 20:00-22:00 every Saturday. Thus, the local office 103 may assign content recommendation periods (e.g., content recommendation period times and content types) of a traffic application at 07:00 every weekday, a news program from 07:30-08:00 every weekday, a kids program from 16:30-17:00 every weekday, the evening local news from 18:00-19:00 every weekday, a sporting event from 19:00-22:00 on Sundays, Mondays, and Thursdays, a drama from 22:00-23:00 every weekday, and a movie from 20:00-22:00 every Saturday. In some embodiments, a content type may also include an application, such as traffic, music, fitness, gaming, shopping, or weather applications.

In some embodiments, the local office 103 may assign a particular content item (e.g., a particular show) to a content recommendation period time period. For example, if the user 308 tends to primarily access the Today Show from 07:30-08:00 every weekday (e.g., over 90% of the time), then the local office 103 may assign the Today Show to that content recommendation period time period instead of a general news content type.

At step 506, the local office 103 may determine, using the historical data 328, user behavior with regard to metadata and contextual features of content found in the user's history (e.g., the historical data 328). As stated above, the historical data 328 may include the behavior of the user 308 regarding how the user 308 accesses and/or interacts with content. Thus, in some embodiments, the user 308 may vary the length of time the user 308 accesses a particular content item. As in the above example, the user 308 may tend to watch a recording of the Today Show 17:00-18:00 every weekday. However, the local office 103 may determine that the user 308 stops accessing or changes to another content item during some of the recordings. In other examples, the local office 103 may determine that the user 308 fast forwards, rewinds, pauses, records, changes volume, and the like while accessing a content item. Thus, the local office 103 may determine various behaviors the user 308 may make while accessing a content item.

The local office 103 may also determine metadata and contextual information of the content items found in the historical data 328. These content items may be items previously accessed by the user 308, and may be content items in which the user stopped accessing before the scheduled end of the content item. For example, the user 308 may tend to watch a recording of the Today Show 17:00-18:00 every weekday. Thus, the local office 103 may assign a content recommendation period time of 17:00-18:00 every weekday with a news (or Today Show) content type/classification. The local office 103 may then determine that the user 308 stops accessing some of the recordings (e.g., stopping the recording) before the end of the content recommendation period time. Thus, the local office 103 may then access contextual information of the recordings in which the user 308 stopped accessing (or all of the recordings/content items).

In one example, the user 308 may stop accessing a recording (out of several recordings of the Today Show) when there is a cooking segment using beef. In another example, the user 308 may fast forward when there is a musical act. In another example, the user 308 may pause and rewind when there is a weather segment. In another example, the user 308 may stop accessing a live, recorded, or on-demand sporting event when the user 308's favorite football team is losing by a lot of points, or when there are less than 20 highlight play sin a football game, or when teams located far from the user's location are playing.

In some embodiments, the user 308 may access a content item for an entire content recommendation period time period or for even longer than the content recommendation period time period. For example, professional football games are generally 3 hours in length. However, in some cases, a game may last longer than 3 hours (such as due to it going into overtime, a lot of injury timeouts, a lot of incomplete passes, an event scheduled before the game going over its scheduled time slot, etc.). Accordingly, in some cases, the user 308 may continue to watch a football game past a content recommendation period time period (such as past 22:00) and into another content recommendation period time period. Thus, contextual features from that game may be analyzed to determine whether any of those contextual features relate to the user's behavior (i.e., continuing to watch the game and/or not going to a recommended next content recommendation period). For example, the user may continue to watch the game if the game is very close, if the user's favorite team is playing, or if it is a special game (such as a championship game).

In some embodiments, the user 308 may tend to always access (e.g., watch live, watch on-demand, or record) a content item if the content item is a new episode of a show. Thus, the local office 103 may analyze metadata of various content items and determine whether there are any "new" episodes. Similarly, the user 308 may tend to never access a content item if the content item is not a new episode of a show. For example, the user 308 may always switch to and watch a linear transmission of a new episode of "Suits" during a time slot of 21:00-22:00, but may not switch to and watch a linear transmission of a repeat episode of "Suits" during that time slot.

At step 508, the local office 103 may perform sensitivity analyses and machine learning techniques to determine the metadata and contextual features relating and/or corresponding to a user's behavior and/or expected/predicted user behavior. Thus, there may be many contextual features in a content item. According to some aspects, the local office 103 may determine a correlation between contextual features of applications (such as weather, gaming, shopping, or traffic, etc.) and a user's behavior. Such contextual features may include whether there is a cooking segment, whether there is a chase scene in a program, whether the score of a football game is 35-7, whether it is raining outside (e.g., derived from a weather application), whether there was a world record set in an Olympic event such as speed skating, etc.

Accordingly, for a given content item, such as a football game, the local office 103 may determine which contextual features may mean more to a user's behavior (e.g., more likely to affect a user's behavior, such as switching channels). These contextual features may include which teams are playing, the score, the time remaining, and the like. For example, the local office 103 may determine that if the user 308's favorite team is playing, the user will tend to abandon the game less frequently than if the user 308's favorite team was not playing. Also, the local office 103 may determine that when the user 308's favorite team is winning, the user 308 abandons the game even less frequently when the user 308's favorite team is just playing (i.e., when the team could be either winning, losing, or tied).

In one example, the user 308 may tend to stop accessing the Today Show when there is a cooking segment while accessing the show on any platform (e.g., live, recorded, on-demand, etc.). Thus, the local office 103 may determine that the user 308 abandons some of the recordings of the Today Show. The local office 103 may then analyze and determine contextual features of those recordings in which the user 308 stop accessing. These contextual features may include features such as the hosts of the Today Show hosting outside the studio during some of the recordings, a musician performing during some of the recordings, holiday decorations, whether or not there is a weather segment, and the like. Some or all of these contextual features may or may not relate to and/or cause the user 308's behavior. To determine which contextual features relate to the user 308's behavior, the local office 103 may determine which contextual features tend to frequently show up across the recordings of the Today Show. As in the above example, the local office 103 may determine that there may be similarities between the episodes in which the user 308 stops accessing, such as all of the episodes contain a cooking segment. The local office 103 may determine when a contextual feature appears/occurs in a recording, and then may determine those contextual features having the highest number of appearances/occurrences (e.g., ranking the contextual features based on occurrence). Higher ranked contextual features may then be determined to be the contextual features that affect the user 308's behavior (e.g., abandoning the recording of the Today Show when there is a cooking segment).

In one example, out of 100 recordings of the Today Show, the user 308 may have abandoned the show 40 times, and out of those 40 times, there has been a cooking segment 35 times, there has not been a weather segment 20 times, there has been a musical performance 4 times, the hosts have hosted outside 8 times, and the like. From these four contextual features, the local office 103 may determine that the user tends to abandon when there is a cooking segment. In some embodiments, a user's behavior may be based on a combination of features. For example, if out of the 35 recordings in which a cooking segment aired, 20 of them did not have a weather segment. Therefore, the local office 103 may determine that the user is even more likely to abandon when there a recording of the Today Show that contains a cooking segment and does not a weather segment than when there is only a cooking segment.

In some embodiments, the local office 103 may also determine at which point during the playback of the Today Show the user 308 stopped or abandoned the playback (e.g., stopped accessing). The local office 103 may use this information in determining which contextual features affect the user 308's behavior. The local office 103 may determine what contextual features happened immediately before and immediately after the point in which the user 308 stopped accessing the recording to determine any pattern(s) in the user's behavior. Additionally, the point/time in the playback in which the user 308 abandoned (or other behavior such as fast forward, rewind, pause, record, modify volume, voice command, etc.) the content item may help in narrowing down a collection of many different contextual features. Also, the local office 103 may give a higher weight or preference to contextual features that are closer to an abandoning point than contextual features that are farther away from the abandoning point.

In some embodiments, the local office 103 may analyze contextual features of applications running on the client device 316. For example, the local office 103 may determine from a weather application that the weather is good. In other situations, the local office 103 may obtain weather from other sources, such as from broadcasted content (e.g., from a weather channel), by having a user input the weather, and the like. In some situations, the local office 103 may obtain the weather via a weather station connected to a premises that contains (or otherwise associated with) the client device 316. Such a weather station may be part of a home automation system that may be maintained and/or accessible by the local office 103. Good weather may include situations in which a percentage of rain for the day may be less than 30%, the temperature may be around the average mark for that time of year or season of the year, and the like. In other embodiments, good weather may include situations in which a deviation from an expected weather condition satisfies a threshold. For example, in Chicago during winter, one may expect the weather to be cold and snowy. Thus, a good weather condition may be cold and snowy. However, in the summer, cold and snowy may be a bad weather condition. Again, using statistical techniques, the local office 103 may determine which types of weather may affect a user's behavior. For example, if the weather is good, then the user 308 may watch television longer than the user would if the weather was not good for that day. For example, it may take the user 308 a shorter time to get to work if the weather is good, thus giving him more time to consume/access content (e.g., watch television). Similarly, the local office 103 may determine other external environmental factors in a similar manner as weather. For example, the local office 103 may determine (e.g., via a traffic application or other method) that if the traffic for the user 308's commute is good for that day (e.g., traffic moving at substantially the speed limit and/or no accidents, and the like), then the user 308 may watch television longer than the user would if the traffic was not good for that day.

In another example, the local office 103 may determine using statistical techniques, the local office 103 may determine which types of video game outcome may influence a user's behavior from that the user 308 is doing poorly in a video game. For example, if the user 308 is accessing a gaming application running on the client device 316, and the user 308 is doing poorly in a video game, the user 308 may abandon the gaming application and switch to an on-demand horror movie. Similarly, if the user 308 is doing great in a video game, the user 308 may continue playing the video game on the gaming application, and may not switch to other content on the client device 316. In another example, the local office 103 may determine from a fantasy football sporting application that the user 308's fantasy football team is doing very well (e.g., scoring more points than any other team in the fantasy football league), and thus the user 308 may access a program corresponding to a mood of the user 308, such as a comedy show. If the user 308's fantasy football team is doing poorly, then the user 308 may access sadder content, such as a dark drama or horror program.

At step 510, the local office 103 may determine the user profile and/or content recommendation period schedule based on the results of both step 506 (e.g., the user behavior with regard to metadata and contextual features of content found in the user's history, as well as metadata and contextual information of the content items found in the historical data 328), and step 508 (e.g., the contextual features relating to a user's behavior and expected/predicted user behavior). Thus, each content recommendation period's content type/classification and/or time period may be specific to contextual features of content accessed by the user 308, and/or specific to the behavior of the user 308 related those contextual features. Thus, for each content recommendation period, there may be several candidates for content type and several candidates for time period, which may be based on the contextual features of a content item, like a show. This will be further described below in more detail. The process 500 may then end at step 512. According to some aspects, the process 500 may end after any of the steps in the process 500. Any of the disclosed steps in FIG. 5 may be omitted, be performed in other than the recited order, repeated, and/or combined.

Returning to FIG. 4, and after determining a profile for the user 308 (or for the client device 316), the process 400 may continue to step 408. At step 408, the local office 103 may determine/recognize a user interaction with the client device 316. A user interaction may be a situation in which a user, such as the user 308, may interact with the client device 316 and/or may desire to access (e.g., watch) content using the client device 316. For example, the user 308 may turn on a television and set-top box, and may watch a television program. In another example, the user 308 may access an application, such as weather, traffic, music, gaming, or internet applications.

In some embodiments, the user 308 may interact with the client device 316 using the input device 314. For example, the user 308 may use a remote control to enter a command (e.g., make a content selection) into the client device 316. The user 308 may do this by entering a number key, an operations key (e.g., "Enter," "Select," etc.), or any other key on the remote. Thus, the local office 103 may determine that the user has interacted with the client device 316 after the local office 103 receives a message from the client device 316 that includes which command the user 308 entered. In some embodiments, the local office 103 may then transmit content to the client device 316 in response to this user interaction (e.g., in response to the remote control command).

In some embodiments, the user 308 may interact with the client device 316 via a motion sensor, which may be the input device 314, and may be operably connected to the client device 316. In this situation, the motion sensor may detect a user's presence, a user's movement, when a user approaches the client device 316 or to the motion sensor, and the like. In some embodiments, there may be a threshold associated with the motion, such that the client device 316 or the input device 314 may detect a user interaction after the user 308 moves at a particular speed. In some situation, there may also be threshold proximity, such that the client device 316 or the input device 314 may detect a user interaction after the user 308 moves within a particular proximity of the client device 316 or the input device 314. The client device 316 may then transmit a message to the local office 103 indicating this user interaction.

According to some aspects, the client device 316 may detect user interaction after a user may have moved the input device 314, such as by picking up a remote. According to some aspects, the client device 316 or the input device 314 may detect vibration as a user interaction, such as when a person walks, closes a door, or opens a door. In these situations, the input device 314 may comprise an accelerometer or other element configured to detect movement of the input device 314. The client device 316 may then transmit a message to the local office 103 indicating this user interaction.

According to some aspects, the client device 316 may detect user interaction after detecting a computing device and/or wireless device, such as a smartphone, laptop, tablet, smartwatch, or Bluetooth device (e.g., devices 302, 304, or 306). For example, the user 308 may be associated (e.g., own or possess) with a smartphone (the device 302), the user 310 may be associated with a Bluetooth device (the device 304), and the user 312 may be associated with a tablet (the device 306). The users 308, 310, and 312 may have previously registered their respective devices with the local office 103 (such as via a cable or internet account). Thus, after the client device 316 detects the device 302, the client device 316 may register a user interaction for the user 308. Similarly, after the client device 316 detects the device 304 and the device 306, the client device 316 may register a user interaction for the user 310 and the user 312. Detecting various users may trigger the client device 316 and/or the local office 103 to implement corresponding profiles (e.g., profiles 322, 324, and 326). In such situations, the client device 316 and/or the local office 103 may determine which profile to implement, or may implement more than one profile. This will be described below in more detail. In one example, the user 308 may drive the user 308's car into the user 308's garage, and the car may join (e.g., via a wireless connection) the network 318 and/or connect to the user 308's home automation system. The client device 316 may then detect the user 308's car and/or that the user 308's car has connected to the network 318 or the home automation system, and thus may register a user interaction for the user 308 based on the detection of the user 308's car.

According to some aspects, the user 308 and/or the device 304 may leave a proximity of the client device 316 (or some other means of not being detected by the local office 103 and/or the client device 316), and thus the client device 316 may no longer detect the user 308 and/or the device 304. In such situations, the client device 316 and/or the local office 103 may then optionally stop implementing a profile (e.g., the user profile 322) associated with the user 308, and may implement a profile (e.g., the user profile 324) associated with any other detected user (e.g., the user 310). Similarly, if the user 308 then returns to be within a close proximity (or otherwise be detected) to the client device 316, the local office 103 may optionally begin to implement the profile associated with the user 308 (e.g., the user profile 322). Such implementation may be based on a hierarchy associated with the profiles (which will be discussed later). Thus, the local office 103 may dynamically change the implementation of profiles.

According to some aspects, the client device 316 may detect user interaction via a prompt. For example, local office may display a on a display of the client device 316 asking whether a user is interacting with the client device 316 or whether a user would like to load a particular profile. In such situations, a user may select, using an input device 314 such as a remote, keyboard, mouse, touch screen, a profile to load onto the client device 316. The profile may be specific to a user or client device, depending on the user's selection.

Other methods of interacting with the client device 316 include using a microphone or camera. With the microphone, the client device 316 and/or the local office 103 may perform speech recognition to detect a command and/or a particular user. For example, the user 308 may want to access a weather application or a weather related program, and may say "weather" into a microphone. The local office 103 may then provide content or a recommendation based on this command. In the case of a camera, the client device 316 may perform facial recognition to determine a particular user.

In some embodiments, the local office 103 may assign a profile form among a plurality of different profiles based on which type of user interaction the local office 103 and/or the client device 316 detected. For example, if the time is 07:00, and the user 308 says "weather" into a microphone (e.g., the input device 314), that user interaction may trigger a particular profile for the user 308. This profile may be, for example, a work day profile, because the local office 103 may determine that the user 308 tends to say "weather" into the microphone before going to work most days. The local office 103 may determine that the user 308 is going to work based on a GPS device or the user's viewing patterns (e.g., not accessing content on the client device 316 during work hours). In another example, a microphone (e.g., the input device 314) may detect other external environmental factors, such as a barking dog at the time of 15:00, because a mailman is approaching the user 308's house. Because mail may be delivered on particular days of the week (e.g., Monday-Friday or Monday-Saturday), a profile for those particular days may be implemented based on the detecting of the barking dog at the time of 15:00. The local office 103 may use other external environmental factors according to aspects disclosed herein.

Additionally, a profile may be selected based on contextual features of applications. For example, the local office 103 may determine that the user 308 tends to work from home on snowy days. The local office 103 may then assign a snowy day profile based on based on a weather application running on client 316 indicating it is snowing or going to snow. Thus, the snowy day profile may include content recommendation periods during the day at times in which the user 308 may usually be at work (such as on a non-snowy day). Additionally, a snowy day profile may contain content recommendation periods having content types/classifications corresponding to the contextual features obtained by the local office 103. For example, content types for a snowy day profile may include content associated snow, such as programs related to Christmas, winter, snowmen, hot chocolate, salt and ice melting, storm preparation, and the like. In another example, the local office 103 may determine that the user 308 tends to access content with little contextual variance (e.g., SpongeBob) while accessing a shopping application. The local office 103 may then assign a shopping profile (e.g., a profile with content having little contextual variance) when the user 308 accesses a shopping application.

At step 410, the local office 103 may, in response to detecting a user interaction, assign a content recommendation period based upon a selected profile (e.g., profiles 322, 324, or 326). Depending on which profile the local office 103 implements, the local office 103 may implement a content recommendation period from that selected profile. As stated above, a profile may be composed of different content recommendation periods. Each content recommendation period may have a content recommendation period time (e.g., start time or time period) and/or an assigned content type/classification (e.g., news, kids, sports, weather application, etc.).

Thus, after the local office 103 detects a user interaction and assigns a profile, the local office 103 then may assign a content recommendation period having a content recommendation period time period that may include the current time. For example, if the current time is 16:06, and the selected profile (e.g., the user profile 322) has a content recommendation period with a content type of kids and a content recommendation period time period of 16:00-16:30, then the local office 103 may assign this content recommendation period. Additionally, if the current time is 16:00, then the local office 103 may also assign this content recommendation period with a content recommendation period time period of 16:00-16:30.

In other cases, the local office 103 may assign a content recommendation period having a content recommendation period start time that is about to begin and/or approaching (e.g., in the future). For example, the user 308 may tend to not access content from the client device 316 between 23:00-07:00, but may have a content recommendation period for a weather application starting at 07:00. In this situation, if the client device 316 detects a user interaction at 06:55, then the local office 103 may assign the content recommendation period for the weather application because the content recommendation period time of 07:00 is approaching.

In some embodiments, the local office 103 may implement a plurality of profiles at step 408, such as profiles 322, 324, and 326 corresponding to the users 308, 310, and 312. Thus, at step 410, the local office 103 may optionally assign a content recommendation period from one of these profiles. In some cases, a user may select (e.g., via a prompt provided by the client device 316) one of the profiles 322, 324, and 326 to implement. In other situations, the local office 103 may determine a consensus content recommendation period that may satisfy all of the assigned profiles. The local office 103 may determine a consensus content recommendation period using a predetermined hierarchy, which may have been established by one or more users, or may be determined by the local office 103. The local office 103 may determine the hierarchy based on a how frequent a profile is implemented on the client device 316. For example, after selecting profiles 322, 324, and 326, the local office 103 may select the user profile 322 if the user profile 322 has been implemented more frequently than either of profiles 324 and 326. Additionally, after implementing the user profile 322, the local office 103 may still recommend content items (such as later in the process 400) using information from the user profile 322's content recommendation periods (e.g., timing and/or content types), but also accounting for historical data of other users, such as the historical data 330 and 332 corresponding to users 310 and 312. This will be described below in more detail.

In some embodiments, the local office 103 may assign a particular content recommendation period based on the type of user interaction. For example, if the user 308 approaches client 316 or if client 316 detects a wireless device of the user 308 (e.g., the device 302), then the user 308 may not necessarily desire to watch a video, and client 316 may assign an application content recommendation period (such as by displaying traffic, weather, social media, time, etc.). If, for example, the user uses a remote to access content, then the local office 103 may assign a programing content recommendation period (such as news, movie, kids, etc.) instead of an application content recommendation period.

At step 412, the local office 103 may determine the amount of time remaining in an assigned content recommendation period. For example, if the current time is 16:06, and the selected profile (e.g., the user profile 322) has a content recommendation period with a content type of kids and a content recommendation period time period of 16:00-16:30, then the local office 103 may assign this content recommendation period and determine that there are 24 minutes left in this content recommendation period. Similarly, the local office 103 may also determine the amount of time until the next content recommendation period. For example, the user 308 may tend to not access content from the client device 316 between 23:00-07:00, but may have a content recommendation period for a weather application starting at 07:00. In this situation, if the client device 316 detects a user interaction at 06:55, then the local office 103 may determine that there is 5 minutes until the weather application content recommendation period. In such situations, the local office 103 may then assign the weather application content recommendation period at 06:55 or may wait until 07:00 to assign it. In some cases, local office may assign one content item for the 5 minutes, and then assign the weather application at 07:00.

At step 414, after selecting a content recommendation period having a content recommendation period time and content type, and after determining the amount of time remaining in the selected content recommendation period, the local office 103 may analyze and retrieve prospect content assets whose content type may correspond to the assigned content recommendation period's content type and/or whose length may correspond to the time remaining in the content recommendation period. For example, if the current time is 16:06, and the selected profile (e.g., the user profile 322) has a content recommendation period with a content type of "kids" and a content recommendation period time period of 16:00-16:30, then the local office 103 may assign this content recommendation period and determine that there are 24 minutes left in this content recommendation period. The local office 103 may then retrieve content assets, such as from content assets analyzed in step 402 or other content received from the content sources 334, having a content type of "kids" and a length of approximately 24 minutes. In some cases, a selected content item's length may not exactly match a time remaining in a content recommendation period. In these situations, the local office 103 may retrieve content having length that is in the vicinity of the time remaining in the content recommendation period (e.g., substantially matches). In the above example, the local office 103 may retrieve content items having a length of 20-40 minutes. However, the local office 103 may give precedence to content items having a length that most closely matches the time available in a content recommendation period over other content items.

The analyzed content assets may include assets configured for any content platform, such as internet, linear, DVR, on-demand, music, and applications (e.g., traffic, weather, social media). In some embodiments, the content assets may be on-demand or DVR platform assets, and a user may have the ability to access these on-demand or DVR assets at any time. Thus, the local office 103 may be able to recommend on-demand or DVR assets for access by a user at any time during a profile's schedule. In some embodiments, the content assets maybe linear or live platform assets, and a use may only have the ability to access these assets during a live broadcast. Thus, the local office 103 may be able to recommend linear assets for access by a user during a live broadcast of those linear assets. This will be discussed below in more detail with regard to the recommendations made by the local office 103.

At step 416, the local office 103 may then determine, assign weights to, and rank candidate content assets from the prospect content assets. The local office 103 may determine these candidate content assets by assigning weights to prospect content assets based on analyzing metadata and contextual features of the prospect content assets and determining the amount of correlation between the metadata and contextual features and a user's profile (e.g., the user profile 322), historical data (e.g., the historical data 328), and/or behavior. The local office 103 may have previously analyzed the metadata and contextual features of the prospect content assets in step 402, but may also analyze the metadata and contextual features of the prospect content assets here at step 416. The local office 103 may then rank the candidate content assets according to their assigned weight.

In one example of the local office 103 assigning weights based on metadata and contextual features, the user profile 322 and/or the historical data 328 may indicate that the user 308 tends to watch professional football on Mondays from 19:00-22:00, Thursdays at 20:00-23:00, and Sundays at 19:00-22:00. The user profile 322 may also indicate that the user tends to watch football games that include the user's favorite team, and tends keep watching games that include the user's favorite team until the end of the content recommendation period time. In this case, football games that include the user's team may be weighted higher than other football games.

Continuing with the previous example, the user profile 322 may also indicate that the user 308 tends to switch from the user's favorite team's football game if the user's favorite team is losing by 21 or more points, but may tend to watch any football game if both the score of the two teams is within 7 points and there has been at least 20 highlight plays in the game. Thus, if the local office 103 retrieves prospect content assets containing 1) a live football game having the user 308's favorite team losing by 28 points, and 2) a live football game not including the user 308's favorite team, but having a score of the two teams within 7 points and there has been 24 highlight plays in the game, then the local office 103 may give a higher weight to the second game with the score of the two teams within 8 points and having at 24 highlight plays in the game.

In another example, the local office 103 may determine that profile 322 and/or the historical data 328 may indicate that the user 308 tends to watch professional football on Mondays from 19:00-22:00, Thursdays at 20:00-23:00, and Sundays at 19:00-22:00, and access a drama from 22:00-23:00 every day of the week. Profile 322 and/or the historical data 328 may indicate that whenever there is a new episode of Downton Abbey on Sundays at 22:00, the user 308 almost always watches the whole episode of Downton Abbey for the entire length of the content recommendation period time of 22:00-23:00. However, professional football games sometimes go into overtime, and may last longer than an expected time (e.g., more than 3 hours). Thus, if the game has previously aired and the user is accessing it on DVR or on-demand, the local office 103 may analyze the metadata and contextual features of the football game and determine that the game lasted longer than three hours. The local office 103 may then provide the football game having a shorter length that fits into the content recommendation period's time period and/or ending at the end of the content recommendation period's time period, and thus not interfering with the next content recommendation period of Downton Abbey at 22:00.

In some situations, the user 308 may interact with the client device 316 in the middle of the content recommendation period time of 19:00-22:00 for professional football on Sunday. In these situations, the local office 103 may retrieve a content asset (e.g., football game) matching the remaining time left in the content recommendation period. Alternatively, the local office 103 may retrieve a shortened version of the game (e.g., such as only showing scoring plays or highlights, only showing the user's favorite team's offensive possessions, and the like, which may be derived from the user 308's behavior in relation to contextual features of the content asset) to substantially match the available time left in the content recommendation period.

In another example, local device 103 may determine the user profile 322 indicating that the user 308 tends to watch a recording of the Today Show from 17:00-18:00 every weekday. The user profile 322 may also indicate that if there is a cooking segment during the recorded broadcast of the Today Show, the user tends to switch from the recording of the Today Show to a 24 hour news channel (e.g., MSNBC) until the end of that content recommendation period (18:00). At 18:00, the user 308 may then tend to watch the local evening news until 19:00. Thus, after the client device 316 records the Today Show, the local office 103 may analyze and determine the metadata and contextual features of that recording. These contextual features may include whether the hosts of the Today Show hosted outside the studio, whether a musician performed, whether there was a holiday theme, whether there was a mistake made by a host, whether or not there was a weather segment, and the like. In this case, the local office 103 may determine that there was a cooking segment during the episode. Thus, referring to the user profile 322 which indicates that the user 308 tends to switch to MSNBC when there is a cooking segment during the recording of the Today Show, the local office 103 may provide a higher weight to MSNBC than to the recording of the Today Show for that content recommendation period having the content recommendation period time of 17:00-18:00.

In another example, the local office 103 may weight prospect content items based on contextual features derived from applications running on the client device 316. For example, the local office 103 may determine from a weather application that the current weather is snowy. In this case, the local office 103 may provide a higher weight to content items associated with snow, such as movies or shows set in the winter or around Christmas.

In some cases, weights may be assigned to content based on the popularity of a program, such as by using ratings, relevancy rankings, or any other method of determining popularity. The popularity of content may also be based on users within a particular proximity to the user 308, across demographics (e.g., age, sex, income, location, etc.), and the like.

At step 418, the local office 103 may then transmit to the client device 316 an indication of one or more of the higher ranked candidate content assets. The local office 103 may make such an indication with a recommendation for a particular candidate content asset. For example, the client device 316 may provide a prompt on a display recommending to the user 308 one or higher ranked candidate content assets for an assigned content recommendation period. In other situations, the local office 103 may transmit to the client device 316 the one or more of the higher ranked candidate content assets. In some cases, the local office 103 may indicate only a highest ranked candidate content asset. Additionally, the client device 316 may automatically access (e.g., play) one of the candidate content assets (such as a highest ranked candidate).

According to some embodiments, an indication and/or recommendation can be based on any data that may be available to local officer 103, such as any information that may have been gathered and/or any event (or interaction) that has or is currently happening. For example, an indication and/or recommendation may be based on a portion of a profile, a portion of the content recommendation period, and the like.

In one example, local device 103 may determine the user profile 322 indicating that the user 308 tends to watch a recording of the Today Show 17:00-18:00 every weekday. The user profile 322 may also indicate that if there is a cooking segment during the recorded broadcast of the Today Show, the user tends to switch from the recording of the Today Show to watch a 24 hour news channel (e.g., MSNBC) until the end of that content recommendation period (18:00). In this case, the local office 103 may determine that there was a cooking segment during the episode. According, referring to the user profile 322 which indicates that the user tends to switch to MSNBC when there is a cooking segment during the recording of the Today Show, the local office 103 may provide a higher weight to MSNBC than to the recording of the Today Show. Thus, the local office 103 may recommend watching MSNBC during the content recommendation period from 17:00-18:00 instead of the Today Show. In this example, the content type of the Today Show (e.g., news) may match the content type of MSNBC (e.g., news). However, in another example, the user 308 may tend to switch to SpongeBob (e.g., kids content type) when the recording of the Today Show features a musical act. Thus, if the recording of the Today Show features a musical act, the local office 103 may recommend watching SpongeBob during the content recommendation period from 17:00-18:00 instead of the Today Show or MSNBC, because SpongeBob would be have a higher ranking or weight based on the local office 103's analysis of the Today Show's contextual features.

In another example, the local office 103 may analyze contextual features of applications running on the client device 316. The local office 103 may determine using a weather application that the weather is good (e.g., not raining). The user profile 322 may indicate a content recommendation period for 07:30-08:00 for news programming. The user profile 322 may also indicate that if the weather is good, then the user 308 may watch television longer than the user would if the weather was not good for that day. Accordingly, after the local office 103 analyzes the weather and determines that the weather is good, then the local office 103 may recommend additional content for the user 308 to access, because, as indicated in the user profile 322, the user 308 tends to watch more television when there is good weather. The additional content may also be based on the historical data 328, which may indicate specific types of content the user tends to watch. In some cases, the local office 103 may assign the weather a value, such as from 1 to 10, with 1 being the worst weather and 10 being the best weather. In these circumstances, the amount of extra time available for the user 308 to watch television may correspond to the assigned weather value. For example, if the weather is assigned a 10, then the user may have an extra 30 minutes to watch television. If the weather is assigned a 7, the user may have an extra 5 minutes to watch television. If the weather is assigned a 5, the user may not have any extra time to watch television, and may follow the content recommendation period time of 07:30-08:00. If the weather is assigned a 1, then the user may have to leave 15 minutes earlier, and may have 15 minutes less to watch television. In the situation where the weather is assigned a 10, the local office 103 may recommend a content asset to fill a one hour time period (e.g., from 07:30-08:30). Alternatively, the local office 103 may recommend a content asset for the original content recommendation period time of 07:30-08:00, and then pick one or more additional content assets to fill the remainder of the time. A similar approach may be used for when weather is assigned a 7 with 5 extra minutes. If the weather is assigned a 1, then the local office 103 may pick one or more content assets to fill the 15 minutes (e.g., from 07:30-07:45), which may be of the same content type as indicated in the content recommendation period.

In another example, the local office 103 may determine using a traffic application that the traffic is good (e.g., traffic moving at substantially the speed limit and/or no accidents). The user profile 322 may indicate a content recommendation period for 07:30-08:00 for news programming. The user profile 322 may also indicate that if the traffic is good, then the user 308 may watch television longer than the user would if the traffic was not good for that day. Accordingly, after the local office 103 analyzes the traffic and determines that the traffic is good, then the local office 103 may recommend additional content for the user 308 to access, because the user 308 tends to watch more television when the traffic is good. Additionally, as in the above weather example, the local office 103 may assign the traffic a value, such as from 1 to 10, with 1 being the worst weather and 10 being the best weather. The local office 103 may then base the amount of time available for extra content on this assigned value, and then determine corresponding content to recommend.

In another example, the user profile 322 may indicate that the user 308 tends to always watch a specific contextual feature, such as a hockey fight between four or more hockey players. Thus, the local office 103 may transmit a recommendation for (or automatically tune to) a content asset containing a hockey fight between four or more hockey players. In these situations, the recommended content may not match time period and/or content type of a currently assigned content recommendation period. However, the local office 103 may make this recommendation because of the very close correlation between the user 308's behavior (e.g., always watching a fight between four or more hockey players) and the contextual features of a content item (e.g., content having a fight between four or more hockey players).

According to some aspects, the local office 103 may examine a social media application on the client device 316 for contextual features that may relate to the user 308's behavior. For example, the local office 103 may analyze social media feeds or posts from friends of the user 308 or people unknown to the user 308 to determine contextual features in these feeds or posts. Such contextual features may include internet content, popular television shows or scenes from those shows, popular movies or scenes from those movies, popular sporting events or plays/acts from those events, and the like. From these contextual features, the local office 103 may then recommend content according to the user 308's behavior. For example, the user profile 322 may indicate that the user 308 tends to always watch a specific contextual feature, such as a hockey fight between four or more hockey players. If the local office 103 determines from the contextual features of a social media application that a hockey fight between four or more hockey players is currently airing, then the local office 103 may transmit a recommendation for (or automatically tune to) the currently airing content asset containing a hockey fight between four or more hockey players. Alternatively, if the hockey fight is on a video-sharing website or on-demand platform, then the local office 103 may recommend content on those mediums and/or platforms to the user 308.

According to some aspects, the client device 316 may detect user interaction after detecting more than one user (e.g., the users 308 and 310), and thus may determine consensus content candidates. Detecting various users may trigger the client device 316 and/or the local office 103 to implement corresponding user profiles (e.g., profiles 322 and 324). In such a situation, a user may select (e.g., via a prompt provided by the client device 316) one of the profiles 322 or 324 to implement. In other situations, the local office 103 may determine a profile to implement using a hierarchy (discussed above). The local office 103 may further analyze the historical data 328 and 330 (corresponding to the users 308 and 310) to determine user behavior and/or viewing patterns of the users 308 and 310. After selecting a profile to implement (e.g., the user profile 322), the local office 103 may assign weights to prospect content assets based on the behavior and viewing patterns of both the users 308 and 310. Thus, the user profile 322 may indicate a content recommendation period with a content recommendation period time of 18:00-19:00 and a content type of local news, and may assign this content recommendation period based on the current time. However, the local office 103 also recognizes the user 310 and may weight content items differently than if the user 310 was not detected. Thus, the local office 103 may determine that the user 310 tends to primarily watch a sitcom from 18:00-19:00, and then may next tend to watch a sports program from 18:00-19:00 (e.g., the user 310 tends to watch a sitcom 75% of the time from 18:00-19:00, tends to watch a sports program 20% of the time from 18:00-19:00, and tends to watch other programs the other 5% of the time). The local office 103 may also determine that the user 308 tends to primarily watch the local news from 18:00-19:00, and then may next tend to watch a sports program from 18:00-19:00 (e.g., the user 308 tends to watch the local news 85% of the time from 18:00-19:00, tends to watch a sports program 10% of the time from 18:00-19:00, and tends to watch other programs the other 5% of the time). Thus, determining that each user's second option for watching television between 18:00-19:00 is the same, the local office 103 may provide greater weight to sports program content items, and subsequently, recommend a sports program content item. Additionally, the recommendation may further be refined if the particular sports program one user tended to watch matched the particular sports program the other user tended to watch.

At step 420, the local office 103 may then track and determine a user's viewing patterns and/or behavior associated with the content indication or recommendation made by the local office 103 in step 418. For example, the user 308 may not accept a recommendation/indication prompt from the local office 103, and may actually access other content. In these cases, the local office 103 may transmit additional recommendations/indications of content items which may be weighted less than candidate content item transmitted in an initial or previous recommendation/indication. In another example, the user 308 may accept/select a recommendation/indication prompt for a content asset transmitted by the local office 103, and local office 103 (or some other content provider) may then transmit content that may correspond to the selected content asset (e.g., the selected program, application, etc.). Another example of user behavior may be that the user 308 did not stop accessing a recommended content item until the end of the content recommendation period (e.g., did not turn or switch to other content). Also, the user 308 may continue to watch a content item that runs over the scheduled content recommendation period. Additionally, the local office 103 may determine that the user 308 stopped accessing a content item (e.g., a content item transmitted by local office 103 selected from an indication/recommendation transmitted by local office 103, a content item that client device 302 automatically tuned to based on an indication/recommendation transmitted by local office 103, and the like), and at which point during the playback of a content item the user 308 stopped the playback. Any behavior or viewing pattern of a user may be determined in step 420.

The process 400 may then return to step 404, where the local office 103 may use the information determined and obtained in step 420 to update, determine, gather, and/or analyze historical data (e.g., the historical data 328) for a user (e.g., the user 308). The process 400 may then continue and may use the updated historical data. The process 400 may end after any of the steps in the process 400. Any of the disclosed steps in FIG. 4 may be omitted, be performed in other than the recited order, repeated, and/or combined.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
   determining, by a computing device, a plurality of profiles associated with a plurality of users of a user device, wherein the plurality of profiles indicate a plurality of content recommendation periods, and wherein each content recommendation period is associated with a content classification;
   receiving a request for a content recommendation;
   determining, for each user of the plurality of users, a corresponding frequency of using the user device;
   ranking the plurality of users based on the frequencies of using the user device;
   selecting, based on the request and from the plurality of content recommendation periods of the plurality of profiles, a first candidate content recommendation period; and
   causing output of an indication of one or more content candidates, based on:
   the ranking, and
   the first candidate content recommendation period.

2. The method of claim 1, wherein the causing output of the indication of one or more content candidates is further based on a current time of day.

3. The method of claim 1, wherein the selecting the first candidate content recommendation period is based on a type of user interaction indicated by the request for the content recommendation.

4. The method of claim 1, further comprising:
ranking the one or more content candidates based on a correlation between historical data associated with a first user and one or more contextual features associated with the one or more content candidates.

5. The method of claim 4, wherein the ranking the one or more content candidates further comprises:
assigning a higher rank to one or more of the one or more content candidates having a time length that substantially corresponds to a remaining time in the first candidate content recommendation period.

6. The method of claim 1, wherein the selecting the first candidate content recommendation period is based on one or more of a behavior of a first user or a location of the first user.

7. The method of claim 1, further comprising:
after receiving the request for the content recommendation, determining at least one environmental factor; and
adjusting, based on the at least one environmental factor, one or more of a start time of the first candidate content recommendation period or an end time of the first candidate content recommendation period.

8. The method of claim 1, further comprising:
adjusting a start time or an end time, of the first candidate content recommendation period, based on one or more of weather or traffic.

9. The method of claim 1, wherein the plurality of content recommendation periods are based on one or more of contextual features associated with:
content previously accessed by a first user; or
behavior associated with the first user.

10. The method of claim 1, further comprising:
based on a first user stopping playback of a content asset, adjusting one or more of a start time of the first candidate content recommendation period, an end time of the first candidate content recommendation period, or a first content classification associated with the first candidate content recommendation period.

11. The method of claim 1, wherein at least two content recommendation periods of the plurality of profiles correspond to a same time period.

12. The method of claim 1, wherein the ranking the plurality of users comprises:
determining which user, among the plurality of users, has a highest frequency of using the user device.

13. The method of claim 1, wherein the ranking the plurality of users comprises:
determining that a first user, among the plurality of users, has a higher frequency of using the user device than a second user among the plurality of users.

14. The method of claim 1, wherein the determining the corresponding frequency of using the user device comprises:
determining a corresponding frequency of implementation, in the user device, of a corresponding profile of the plurality of profiles.

15. The method of claim 1, wherein the selecting the first candidate content recommendation period is based on data received, from the user device, that indicates a state of an application running on the user device.

16. The method of claim 1, wherein the causing output of the indication of one or more content candidates based on the first candidate content recommendation period comprises:
determining an amount of time remaining in the first candidate content recommendation period; and
determining at least one of the one or more content candidates as being a content item, of a plurality of content items, that has the content classification of the first candidate content recommendation period and that has a length most closely matching the amount of time remaining.

17. A method comprising:
determining, by a computing device, a plurality of profiles associated with a plurality of users of a user device, wherein each of the plurality of profiles indicate a plurality of content recommendation periods, and wherein each content recommendation period is associated with a content classification;
receiving a request for a content recommendation;
determining, for each user of the plurality of users, a corresponding frequency of using the user device;
selecting, based on determining a user, of the plurality of users, associated with the highest frequency of the determined frequencies, a profile of the plurality of profiles;
selecting, based on the request and from the plurality of content recommendation periods of the selected profile, a first candidate content recommendation period; and
causing output of an indication of one more content candidates, based on the first candidate content recommendation period.

18. The method of claim 17, wherein the determining the corresponding frequency of using the user device comprises:
determining a corresponding frequency of implementation, in the user device, of a corresponding profile of the plurality of profiles.

19. The method of claim 17, wherein the selected profile comprises a profile of the user who has used the user device the most.

20. A method comprising:
receiving an indication of a user interaction with a plurality of content assets;
determining, by a computing device and based on the indication of the user interaction, a plurality of profiles associated with a plurality of users of a user device, wherein each of the plurality of profiles indicates a plurality of content recommendation periods, and wherein each content recommendation period is associated with a content classification;
receiving a request for a content recommendation;
determining, for each of the plurality of profiles, a corresponding frequency of use on the user device;
selecting, based on the frequencies, a profile of the plurality of profiles;
selecting, based on the request and from the plurality of content recommendation periods of the selected profile, a first candidate content recommendation period; and
causing output of an indication of one or more content candidates, based on the first candidate content recommendation period.

21. The method of claim 20, wherein the selecting the first candidate content recommendation period is based on data indicating a state of an application running on the user device.

* * * * *

UNITED STATES PATENT AND TRADEMARK OFFICE
CERTIFICATE OF CORRECTION

| | | |
|---|---|---|
| PATENT NO. | : 11,593,423 B2 | |
| APPLICATION NO. | : 16/993789 | |
| DATED | : February 28, 2023 | |
| INVENTOR(S) | : Des Jardins et al. | |

It is certified that error appears in the above-identified patent and that said Letters Patent is hereby corrected as shown below:

In the Specification

Column 25, Detailed Description, Line 14:
Delete "officer" and insert --office-- therefor Column 28, Detailed Description, Line 19:
Delete "302" and insert --316-- therefor Signed and Sealed this
Fourteenth Day of May, 2024

*Katherine Kelly Vidal*

Katherine Kelly Vidal
*Director of the United States Patent and Trademark Office*